United States Patent
Takaoka

(10) Patent No.: US 11,060,951 B2
(45) Date of Patent: Jul. 13, 2021

(54) FAULT DIAGNOSIS DEVICE FOR FLUID FEED SYSTEM AND FAULT DIAGNOSIS METHOD FOR FLUID FEED SYSTEM

(71) Applicant: TOYOTA JIDOSHA KABUSHIKI KAISHA, Toyota (JP)

(72) Inventor: Kazuya Takaoka, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 16/459,724

(22) Filed: Jul. 2, 2019

(65) Prior Publication Data

US 2020/0064222 A1 Feb. 27, 2020

(30) Foreign Application Priority Data

Aug. 21, 2018 (JP) .............................. JP2018-154874

(51) Int. Cl.
*G01M 13/00* (2019.01)
*F04C 2/18* (2006.01)

(52) U.S. Cl.
CPC .............. *G01M 13/00* (2013.01); *F04C 2/18* (2013.01); *F04C 2270/80* (2013.01)

(58) Field of Classification Search
CPC ...... G01M 15/09; G01M 3/025; G01M 13/00; F04C 2270/80; F04C 2/18
USPC ........................................................ 73/168
See application file for complete search history.

(56) References Cited

U.S. PATENT DOCUMENTS

| | | | | |
|---|---|---|---|---|
| 4,181,017 A | * | 1/1980 | Markle | ................. F15B 19/005 137/489 |
| 5,594,180 A | * | 1/1997 | Carpenter | ................. G01F 1/74 303/15 |
| 6,375,591 B1 | * | 4/2002 | Wakahara | ............... F16H 61/12 475/119 |
| 2003/0015029 A1 | * | 1/2003 | Berger | .................... B60T 8/885 73/121 |
| 2008/0264041 A1 | | 10/2008 | Gerlach | |
| 2014/0238352 A1 | * | 8/2014 | Methil | .................... F02M 69/50 123/456 |
| 2017/0003179 A1 | * | 1/2017 | Jin | ........................ F01N 13/008 |
| 2018/0138015 A1 | * | 5/2018 | Ghantasala | ............ G01R 27/04 |
| 2021/0071888 A1 | * | 3/2021 | Mowris | .................... F24F 11/38 |

FOREIGN PATENT DOCUMENTS

JP          4908397 B2       4/2012

* cited by examiner

Primary Examiner — Andre J Allen
(74) Attorney, Agent, or Firm — Oliff PLC

(57) ABSTRACT

A fault diagnosis device for a fluid feed system comprises a first acquiring part acquiring values as a fluid pressure and pump rotational speed before fluid injection, a second acquiring part acquiring values as a fluid pressure and pump rotational speed during fluid injection, a pump rotational speed difference calculating part calculating a pump rotational speed difference comprising a difference between a pump rotational speed during fluid injection and a pump rotational speed before fluid injection when the fluid pressure before fluid injection and the fluid pressure during fluid injection match, and an abnormality judging part judging if an abnormality has occurred in a flow rate of fluid injected from an injection device based on the pump rotational speed difference.

15 Claims, 10 Drawing Sheets ial speed in a certain time period as the fluid pressure and pump rotational speed during fluid injection, a pump rotational speed difference calculating part configured to calculate a pump rotational

FAULT DIAGNOSIS DEVICE FOR FLUID FEED SYSTEM AND FAULT DIAGNOSIS METHOD FOR FLUID FEED SYSTEM

FIELD

The present disclosure relates to a fault diagnosis device for a fluid feed system and to a fault diagnosis method for a fluid feed system.

BACKGROUND

Japanese Patent No. 4908397 discloses a fluid feed system for injecting a reaction agent (fluid) into an exhaust passage of an internal combustion engine. This fluid feed system is provided with a pressure sensor for detecting a pressure of the reaction agent inside piping in which the reaction agent is pumped. In a predetermined section of the piping where pressure changes occur, for example, if the expected pressure changes do not closely occur, it was judged that there was an abnormality in the fluid feed system.

SUMMARY

However, the disclosure described in the above-mentioned Japanese Patent No. 4908397 did not consider the effects of the viscosity of the reaction agent correlated with the temperature of the reaction agent. Pressure changes in piping occur due to, for example, the reaction agent being discharged from inside the piping at the time of injection of the reacting agent, but the amount of discharge of the reaction agent discharged from inside the piping at this time changes due to the effect of the viscosity of the reaction agent. For this reason, even if an abnormality arises in the fluid feed system and pressure changes different from normal occur, until the difference of the pressure changes becomes sufficiently large, it is not possible to judge if the difference of the pressure changes was due to the effects of the viscosity of the reaction agent or was due to an abnormality in the fluid feed system. There was therefore the problem of a low accuracy of fault diagnosis.

The present disclosure was made focusing on such a problem and has as its object the improvement of the accuracy of fault diagnosis of a fluid feed system.

To solve the above problem, according to one aspect of the present disclosure, there is provided a fault diagnosis device for a fluid feed system for diagnosing a fault of the fluid feed system. The fluid feed system is provided with a gear pump, an injection device for injecting fluid discharged from the gear pump, a fluid passage connecting the gear pump and the injection device, a discharge passage connected to the fluid passage for discharging excess fluid in the fluid discharged from the gear pump, a pressure detector provided in the fluid passage and detecting a fluid pressure comprised of pressure of the fluid discharged from the gear pump, and a rotational speed detector detecting a pump rotational speed comprised of a rotational speed of the gear pump. The fault diagnosis device comprises a first acquiring part configured to acquire a fluid pressure and pump rotational speed at a certain point of time before fluid injection where the injection device is not injecting fluid or average values of the fluid pressure and pump rotational speed in a certain time period as the fluid pressure and pump rotational speed before fluid injection, a second acquiring part configured to acquire a fluid pressure and pump rotational speed at a certain point of time during fluid injection where the injection device is injecting fluid or average values of the fluid pressure and pump rotational speed in a certain time period as the fluid pressure and pump rotational speed during fluid injection, a pump rotational speed difference calculating part configured to calculate a pump rotational speed difference comprised of a difference between a pump rotational speed during fluid injection and a pump rotational speed before fluid injection when the fluid pressure before fluid injection and the fluid pressure during fluid injection match, and an abnormality judging part configured to judge if an abnormality has occurred in the flow rate of the fluid injected from the injection device based on the pump rotational speed difference.

Further, according to another aspect of the present disclosure, there is provided a fault diagnosis device for a fluid feed system for diagnosing a fault of the fluid feed system. The fluid feed system is provided with a gear pump, an injection device for injecting fluid discharged from the gear pump, a fluid passage connecting the gear pump and the injection device, a discharge passage connected to the fluid passage for discharging excess fluid in the fluid discharged from the gear pump, a pressure detector provided in the fluid passage and detecting a fluid pressure comprised of pressure of the fluid discharged from the gear pump, and a rotational speed detector detecting a pump rotational speed comprised of a rotational speed of the gear pump. The fault diagnosis device comprises a storage part configured to acquire and store a fluid pressure and pump rotational speed at a certain point of time before fluid injection where the injection device is not injecting fluid or average values of the fluid pressure and pump rotational speed in a certain time period as the initial fluid pressure and initial pump rotational speed before fluid injection, an acquiring part configured to acquire a fluid pressure and pump rotational speed at any point of time before fluid injection after acquiring the initial fluid pressure and initial pump rotational speed before fluid injection or average values of the fluid pressure and pump rotational speed in any time period as the fluid pressure and pump rotational speed before fluid injection, a pump rotational speed difference calculating part configured to calculate a pump rotational speed difference comprised of a difference between an initial pump rotational speed before fluid injection and a pump rotational speed before fluid injection when the fluid pressure before fluid injection and the fluid pressure during fluid injection match, and an abnormality judging part configured to judge if an abnormality of clogging or leaking of the fluid at the fluid passage has occurred based on the pump rotational speed difference.

Further, according to another aspect of the present disclosure, there is provided a fault diagnosis method for a fluid feed system which is provided with a gear pump, an injection device for injecting fluid discharged from the gear pump, a fluid passage connecting the gear pump and the injection device, a discharge passage connected to the fluid passage for discharging excess fluid in the fluid discharged from the gear pump, a pressure detector provided in the fluid passage and detecting a fluid pressure comprised of pressure of the fluid discharged from the gear pump, and a rotational speed detector detecting a pump rotational speed comprised of a rotational speed of the gear pump. The fault diagnosis method comprises a first acquiring step of acquiring a fluid pressure and pump rotational speed at a certain point of time before fluid injection where the injection device is not injecting fluid or average values of the fluid pressure and pump rotational speed in a certain time period as the fluid pressure and pump rotational speed before fluid injection, a second acquiring step of acquiring a fluid pressure and pump rotational speed at a certain point of time during fluid injection where the injection device is injecting fluid or average values of the fluid pressure and pump rotational speed in a certain time period as the fluid pressure and pump rotational speed during fluid injection, a pump rotational speed difference calculating step calculating a pump rotational speed difference comprised of a difference between a pump rotational speed during fluid injection and a pump rotational speed before fluid injection when the fluid pressure before fluid injection and the fluid pressure during fluid injection match, and an abnormality judging step judging if an abnormality has occurred in the flow rate of the fluid injected from the injection device based on the pump rotational speed difference.

Further, according to another aspect of the present disclosure, there is provided a fault diagnosis method for a fluid feed system which is provided with a gear pump, an injection device for injecting fluid discharged from the gear pump, a fluid passage connecting the gear pump and the injection device, a discharge passage connected to the fluid passage for discharging excess fluid in the fluid discharged from the gear pump, a pressure detector provided in the fluid passage and detecting a fluid pressure comprised of pressure of the fluid discharged from the gear pump, and a rotational speed detector detecting a pump rotational speed comprised of a rotational speed of the gear pump. The fault diagnosis method comprises a storage step of acquiring and storing a fluid pressure and pump rotational speed at a certain point of time before fluid injection where the injection device is not injecting fluid or average values of the fluid pressure and pump rotational speed in a certain time period as the initial fluid pressure and initial pump rotational speed before fluid injection, an acquiring step of acquiring a fluid pressure and pump rotational speed at any point of time before fluid injection after acquiring the initial fluid pressure and initial pump rotational speed before fluid injection or average values of the fluid pressure and pump rotational speed in any time period as the fluid pressure and pump rotational speed before fluid injection, a pump rotational speed difference calculating step calculating a pump rotational speed difference comprised of a difference between an initial pump rotational speed before fluid injection and a pump rotational speed before fluid injection when the fluid pressure before fluid injection and the fluid pressure during fluid injection match, and an abnormality judging step of judging if an abnormality of clogging or leaking of the fluid at the fluid passage has occurred based on the pump rotational speed difference.

According to these aspects of the present disclosure, it is possible to improve the accuracy of fault diagnosis of a fluid feed system.

DESCRIPTION OF EMBODIMENTS

Figure 1:
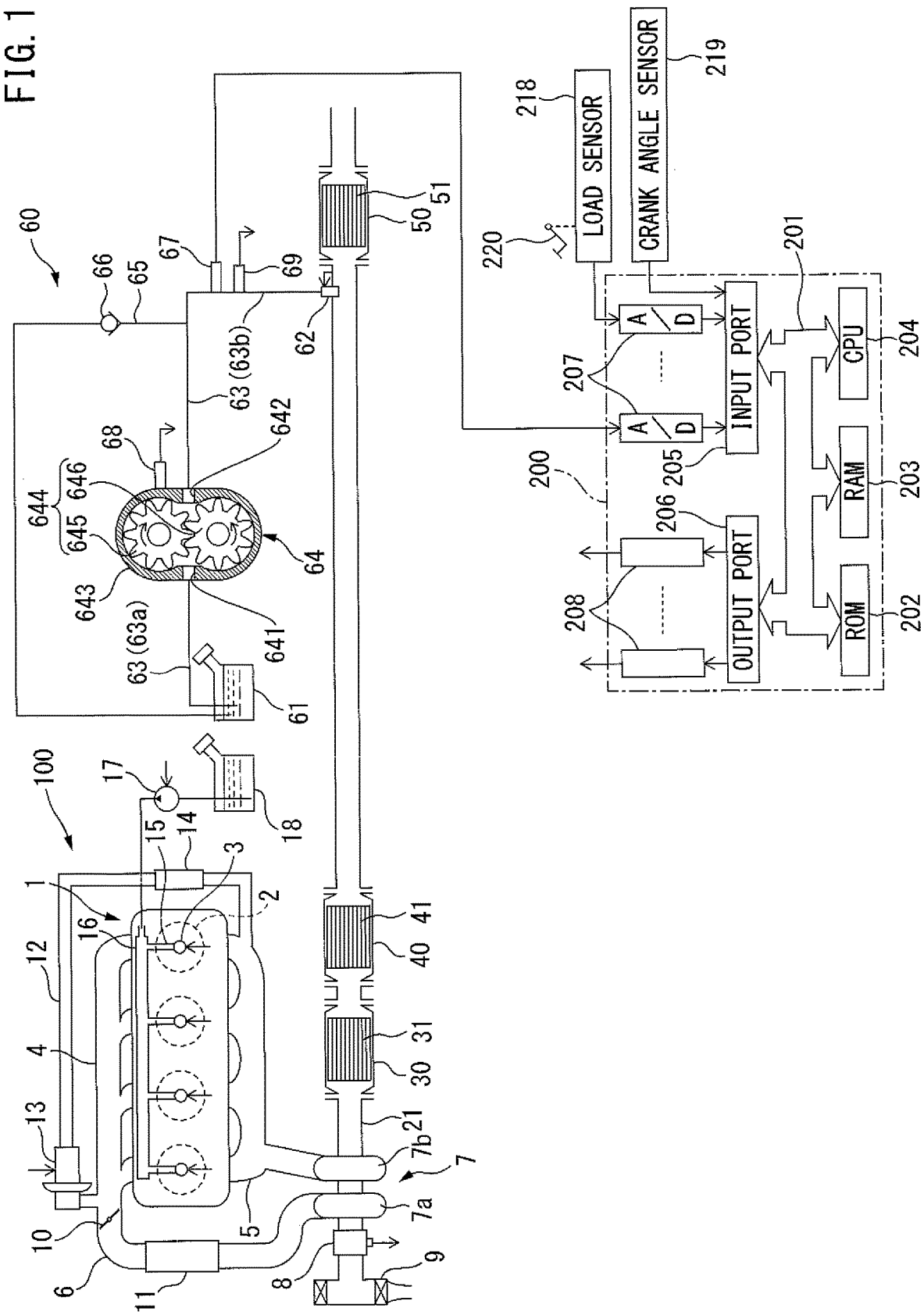
FIG. 1 is a schematic view of the configuration of an internal combustion engine provided with an aqueous urea solution feed system as a fluid feed system according to a first embodiment of the present disclosure and an electronic control unit controlling the internal combustion engine.

Below, referring to the drawings, embodiments of the present invention will be explained in detail. Note that, in the following description, similar component elements will be assigned the same reference notations.

First Embodiment

FIG. 1 is a schematic view of the configuration of an internal combustion engine 100 provided with an aqueous urea solution feed system 60 as a fluid feed system according to a first embodiment of the present disclosure and an electronic control unit 200 controlling the internal combustion engine 100.

The internal combustion engine 100 burns fuel inside of an engine body 1 to, for example, generate power for driving a vehicle etc. The internal combustion engine 100 includes combustion chambers 2 formed inside of the engine body 1, electronic control type fuel injectors 3 for respectively injecting fuel into the combustion chambers 2, an intake manifold 4 for introducing intake air into the combustion chambers 2, and an exhaust manifold 5 for discharging exhaust from the combustion chambers 2.

Each fuel injector 3 is connected through a fuel supply pipe 15 to a common rail 16. The common rail 16 is connected through a variable discharge electronic control type fuel pump 17 to a fuel tank 18. The fuel stored in the fuel tank 18 is supplied by the fuel pump 17 to the inside of the common rail 16. The fuel supplied to the inside of the common rail 16 is supplied through each fuel supply pipe 15 to a fuel injector 3.

The intake manifold 4 is connected through an intake duct 6 to an outlet of a compressor 7a of a turbocharger 7. An inlet of the compressor 7a is connected through an air flow meter 8 to an air cleaner 9. Inside of the intake duct 6, an electrical control type throttle valve 10 is arranged. In the intake duct 6, an intercooler 11 is arranged for cooling the intake air flowing through the inside of the intake duct 6.

The exhaust manifold 5 is connected to an inlet of a turbine 7b of the turbocharger 7. An outlet of the turbine 7b is connected to an exhaust pipe 21 at which an exhaust after-treatment system 20 is provided. The exhaust manifold 5 and the intake manifold 4 are connected with each other so as to perform exhaust gas recirculation (below, referred to as "EGR") via an EGR passage 12. Inside of the EGR passage 12, an electronic control type EGR control valve 13 is arranged. At the EGR passage 12, an EGR cooler 14 is arranged so as to cool the EGR gas flowing through the inside of the EGR passage 12.

The exhaust after-treatment system 20 is a device for treating exhaust discharged from the combustion chambers 2 to remove harmful substances in the exhaust, then discharge it to the outside air. The exhaust after-treatment system 20 is provided with a first catalytic converter 30, a particulate trap 40, a second catalytic converter 50, and a fluid feed system constituted by an aqueous urea solution feed system 60.

The first catalytic converter 30 is comprised of a carrier 31 carrying an exhaust purification catalyst comprised of an oxidation catalyst (two-way catalyst) and is provided at the exhaust pipe 21. The oxidation catalyst oxidizes the harmful substances in the exhaust, that is, the hydrocarbons (HC) and carbon monoxide (CO), and renders them harmless substances (water and carbon dioxide).

The particulate trapping device 40 is provided in the exhaust pipe at the downstream side from the first catalytic converter 30. The particulate trapping device 40 has a wall-flow type particulate filter 41 built into it and runs exhaust introduced inside it through the particulate filter 41 to trap the particulate matter in the exhaust.

The second catalytic converter 50 is comprised of a carrier 51 carrying an exhaust purification catalyst comprised of an $NO_X$ selective reduction catalyst (SRC) and is provided at the exhaust pipe at the downstream side from the particulate trapping device 40. The $NO_X$ selective reduction catalyst selectively reduces the harmful substances in the exhaust, that is, the $NO_X$, and renders them to harmless substances (water and nitrogen) by being supplied with a reducing agent. The $NO_X$ selective reduction catalyst according to the present embodiment selectively reduces the $NO_X$ contained in the exhaust using the ammonia produced by hydrolysis of the urea aqueous solution as a reducing agent.

The aqueous urea solution feed system 60 is provided with an aqueous urea solution tank 61, aqueous urea solution injector 62, aqueous urea solution feed pipe 63, gear pump 64, aqueous urea solution return pipe 65, check valve 66, pressure sensor 67, rotational speed sensor 68, and temperature sensor 69.

The aqueous urea solution tank 61 stores the aqueous urea solution.

The aqueous urea solution injector 62 is provided in the exhaust pipe 21 at the downstream side from the particulate trap 40 and the upstream side from the second catalytic converter 50 and injects an aqueous urea solution to the inside of the exhaust pipe 21. The aqueous urea solution injector 62 is, for example, a needle valve and is controlled to open and close by the electronic control unit 200. By controlling the opening period of the aqueous urea solution injector 62, the flow rate of the aqueous urea solution injected from the aqueous urea solution injector 62 is controlled. The aqueous urea solution injected to the inside of the exhaust pipe 21 receives exhaust heat and is hydrolyzed when heated to a predetermined hydrolysis temperature (for example 180° C.).

The aqueous urea solution feed pipe 63 is a passage for feeding the aqueous urea solution stored in the aqueous urea solution tank 61 to the aqueous urea solution injector 62 and is provided with a low pressure side feed pipe 63a and a high pressure side feed pipe 63b. The low pressure side feed pipe 63a is a passage connecting the aqueous urea solution tank 61 and the intake port 641 of the gear pump 64. The high pressure side feed pipe 63b is a passage connecting the discharge port 642 of the gear pump 64 and the aqueous urea solution injector 62.

The gear pump 64 is provided with a housing 643 in which an intake port 641 and a discharge port 642 are formed and a pair of cavities 644 accommodated inside the housing 643. The cavities 644 are provided with drive gears 645 driven to rotate by external power (for example, power of the internal combustion engine or electric motor etc.) and driven gears 646 circumscribing the drive gears 645 and driven to rotate by the drive gears 645. When the gear pump 64 is driven (that is, the drive gear 645 is driven to rotate), the aqueous urea solution stored in the aqueous urea solution tank 61 is sucked through the low pressure side feed pipe 63a from the intake port 641 to the inside of the gear pump 64, is pressurized inside the gear pump 64, and is discharged from the discharge port 642 to the high pressure side feed pipe 63b.

The aqueous urea solution return pipe 65 is a passage for returning the aqueous urea solution discharged from the gear pump 64 to the high pressure side feed pipe 63b to the aqueous urea solution tank 61 according to need. One end is connected to the high pressure side feed pipe 63b, while the other end is connected to the aqueous urea solution tank 61.

The check valve 66 is provided at the aqueous urea solution return pipe 65. The check valve 66 is configured so as to automatically open when the pressure of the aqueous urea solution inside the high pressure side feed pipe 63b becomes a predetermined upper limit pressure. Due to this, the pressure of the aqueous urea solution inside the high pressure side feed pipe 63b is kept from becoming higher than the upper limit pressure.

The pressure sensor 67 is provided at the high pressure side feed pipe 63b. The pressure sensor 67 detects the pressure of the aqueous urea solution inside the high pressure side feed pipe 63b corresponding to the pressure of the aqueous urea solution discharged from the discharge port 642 of the gear pump 64. In the following explanation, this pressure of the aqueous urea solution detected by the pressure sensor 67 will be referred to as the "aqueous urea solution pressure".

The rotational speed sensor 68 is attached to the gear pump 64. The rotational speed sensor 68 detects the rotational speed of the gear pump 64, more specifically the rotational speed of the drive gear 645. In the following explanation, the rotational speed of the gear pump 64 detected by this rotational speed sensor 68 will be referred to as the "pump rotational speed".

The temperature sensor 69 is provided at the high pressure side feed pipe 63b. The temperature sensor 69 detects the temperature of the aqueous urea solution discharged from the discharge port 642 of the gear pump 64. In the following explanation, the temperature of the aqueous urea solution detected by the pressure sensor 67 will be referred to as the "aqueous urea solution temperature". Note that it is also possible to attach the temperature sensor 69 to the aqueous urea solution tank 61 and use the temperature of the aqueous urea solution of the aqueous urea solution tank 61 as the temperature of the aqueous urea solution discharged from the discharge port 642 of the gear pump 64.

The electronic control unit 200 is comprised of a digital computer provided with components connected with each other by a bidirectional bus 201 such as a ROM (read only memory) 202, RAM (random access memory) 203, CPU (microprocessor) 204, input port 205, and output port 206.

The input port 205 receives as input the output signals of the above-mentioned pressure sensor 67 etc. through the corresponding AD converters 207. Further, the input port 205 receives as input an output voltage of a load sensor 218 generating an output voltage proportional to the amount of depression of an accelerator pedal 220 (below, referred to as the "amount of accelerator depression") through a corresponding AD converter 207. Furthermore, the input port 205 receives as input as a signal for calculating the engine rotational speed an output signal of a crank angle sensor 219 generating an output pulse every time a crankshaft of the engine body 1 turns by for example 15°.

At the output port 206, an aqueous urea solution injector 62 and various other controlled parts are electrically connected through corresponding drive circuits 208.

The electronic control unit 200 outputs control signals for controlling the various controlled parts from the output port 206 to control the internal combustion engine 100 based on the output signals of the various sensors input to the input port 205. Further, the electronic control unit 200 performs fault diagnosis for detecting an abnormality in the internal combustion engine 100. As one of these, it performs fault diagnosis of the aqueous urea solution feed system 60.

In the fault diagnosis of the aqueous urea solution feed system 60 according to the present embodiment, it is diagnosed if an abnormality of an amount of injection of the aqueous urea solution injector 62 (below, referred to as the "amount of urea injection") being insufficient with respect to the target amount of urea injection (below, referred to as a "first abnormality") has occurred or, conversely, if an abnormality of the amount of urea injection being in excess with respect to the target amount of urea injection (below, referred to as a "second abnormality") has occurred.

The first abnormality arises, for example, due to foreign matter contained in the aqueous urea solution tank 61 clogging the high pressure side feed pipe 63b or aqueous urea solution injector 62 or due to the opening amount of the aqueous urea solution injector 62 ending up becoming smaller than the opening amount at normal times due to some sort of reason (for example, aging). If the first abnormality occurs, the necessary and sufficient reducing agent can longer to fed to the $NO_X$ selective reduction catalyst, so the exhaust purification performance at the $NO_X$ selective reduction catalyst falls and the exhaust emission deteriorates.

The second abnormality occurs, for example, due to the amount of injection from the clearance of the valve body to the valve seat when opening the aqueous urea solution injector 62 becoming greater due to wear or the valve body or valve seat of the aqueous urea solution injector 62. If the second abnormality occurs, the amount of consumption of the aqueous urea solution increases to more than the necessary level and ammonia gas is liable to be discharged as is to the outside air.

For this reason, it is desirable to detect when such a first abnormality or second abnormality has occurred early and with good accuracy.

Here, as a conventional method for detecting the first abnormality or second abnormality, for example, there is the method of judging if an extent of drop of the aqueous urea solution pressure (pressure inside high pressure side feed pipe 63b) when opening the aqueous urea solution injector 62 to inject the aqueous urea solution in a state where the flow rate of discharge of the gear pump 64 is controlled to a certain flow rate of discharge, that is, in a state where the aqueous urea solution pressure is controlled to a certain fixed pressure, is kept within a predetermined range. If the first abnormality occurs, the extent of drop of the aqueous urea solution pressure becomes smaller than usual by exactly the amount by which the amount of urea injection is insufficient with respect to the target amount of urea injection. On the other hand, if the second abnormality occurs, the extent of drop of the aqueous urea solution pressure becomes larger than usual by exactly the amount by which the amount of urea injection is in excess with respect to the target amount of urea injection. For this reason, in order for this conventional method to detect the first abnormality or the second abnormality early, reduction of the span of the predetermined range is sought. However, with this method, due to the following reason, there was the problem that the span of this predetermined range cannot be reduced to a certain fixed level or less.

Below, referring to FIG. 2A to FIG. 2C, the reason will be explained.

Figure 2A:
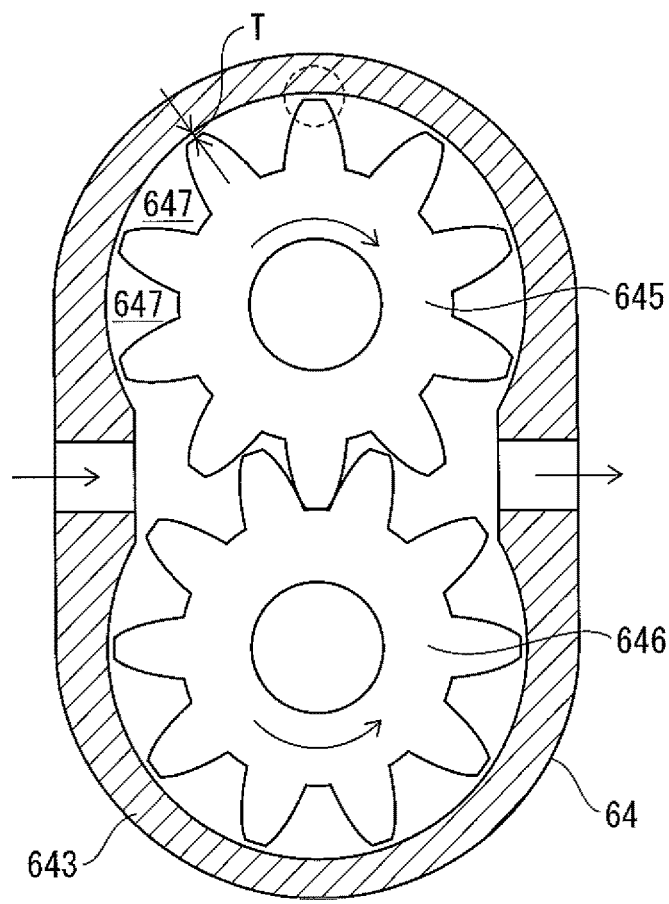
FIG. 2A is a schematic view of a gear pump along a diametrical direction of a shaft of a drive gear.

FIG. 2A is a schematic view of the gear pump 64 along the diametrical direction of the shaft of the drive gear 645 and a view similar to the view shown as the gear pump 64 in FIG. 1. FIG. 2B is a schematic view of the gear pump 64 along the axial direction of the shaft of the drive gear 645. FIG. 2C is an enlarged view of the part surrounded by the broken lines in FIG. 2A.

A theoretical discharge flow rate $Q_{th}$ of the gear pump 64 comprised of a volume type pump, as shown in the following equation (1), can be expressed as a product of the theoretical displacement volume $V_{th}$ of the gear pump 64 and pump rotational speed N (rotational speed of drive gear 645 per unit time). Note that the theoretical displacement volume $V_{th}$ is the total of the volumes of the tooth trough spaces 647 of the drive gear 645 shown in FIG. 2A and is a value corresponding to the amount of aqueous urea solution theoretically discharged from the discharge port 642 when the drive gear 645 turns once.

[Equation 1]

$$Q_{th} = V_{th} \cdot N \quad (1)$$

Figure 2B:
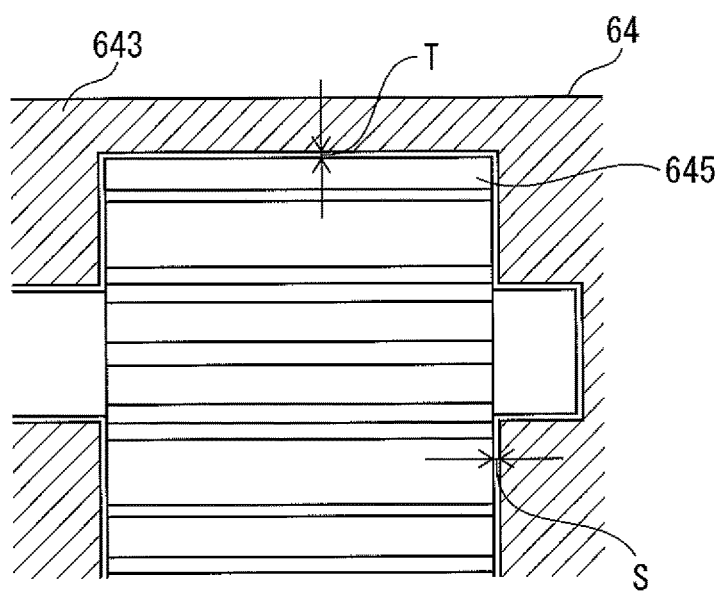
FIG. 2B is a schematic view of the gear pump along an axial direction of the shaft of the drive gear.

Here, the gear pump 64, as shown in FIG. 2A and FIG. 2B, has fine tooth top clearances T between the inner circumferential surface of the housing 643 and the tooth tops of the drive gear 645. Further, as shown in FIG. 2B, it has fine side surface clearances S between the inner circumferential surface of the housing 643 and the side surfaces of the drive gear 645. For this reason, in the gear pump 64, part of the theoretical discharge flow rate $Q_{th}$ leaks through the tooth top clearances T and side surface clearances S present between the housing 643 and the gear from the high pressure discharge port 642 side to the low pressure suction port 641 side.

At this time, it is known that the leakage flow rate $q_S$ from the side surface clearances S, as shown by the following equation (2), can be expressed using the constant $K_S$ (constant of 0.5 to 1.5 in range), the aqueous urea solution pressure P at the discharge port 642 side of the gear pump 64, the viscosity (viscosity coefficient) μ of the aqueous urea solution, and the side surface clearances S:

[Equation 2]

$$q_S = K_S \cdot \frac{P}{\mu} S^3 \quad (2)$$

Further, it is known that the leakage flow rate $q_T$ from the tooth top clearances T, as shown by the following equation (3), can be expressed using the constant $K_T$ determined by the shape of the drive gear 645, the aqueous urea solution pressure P at the discharge port 642 side of the gear pump 64, the viscosity (viscosity coefficient) μ of the aqueous urea solution, and the tooth top clearances T:

[Equation 3]

$$q_T = K_T \cdot \frac{P}{\mu} T^3 \qquad (3)$$

Figure 2C:
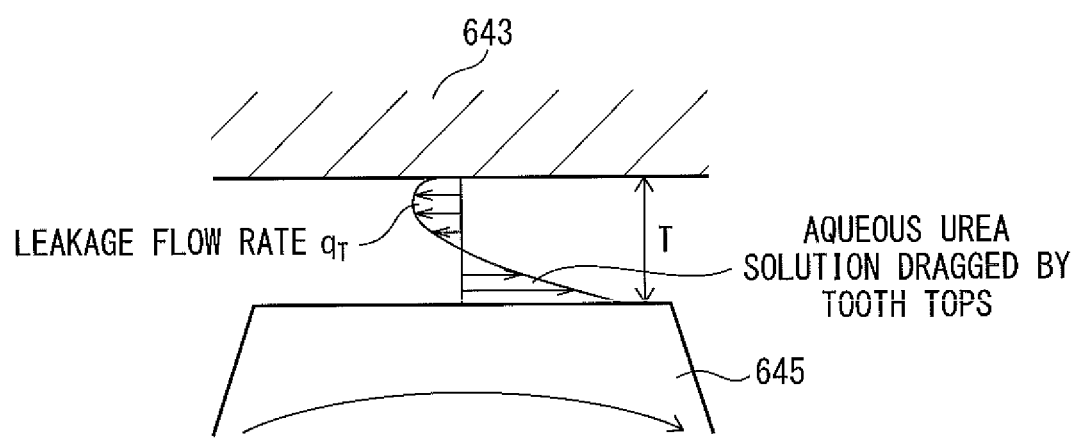
FIG. 2C is an enlarged view of a part surrounded by broken lines in FIG. 2A.

On the other hand, at the tooth top clearances T, as shown in FIG. 2C, separate from the theoretical discharge flow rate $Q_{th}$ and the leakage flow rate $q_T$, there is aqueous urea solution dragged by the tooth tops of the drive gear 645 and moving to the discharge port 642 side along with rotation of the drive gear 645.

If considering these, the actual discharge flow rate of the gear pump 64 (below, referred to as the "actual discharge flow rate") Q can be expressed as shown in the following equation (4). Note that, in equation (4), the (1+c) of the first term on the right side is the part relating to the aqueous urea solution dragged by the tooth tops of the driver gear 645 and moving to the discharge port 642 side in addition to the theoretical discharge flow rate $Q_{th}$, while "c" is a positive constant. Further, $K_n$ is a coefficient expressing what ratio of the theoretical discharge amount is actually discharged due to meshing of the gears.

[Equation 4]

$$Q = (1+c) \cdot K_n \cdot V_{th} \cdot N - (K_S \cdot S^3 + K_T \cdot T^3) \cdot \frac{P}{\mu} \qquad (4)$$

As shown in this equation (4), the actual discharge flow rate Q of the gear pump 64 changes affected by the tooth top clearances T and side surface clearances S and the viscosity μ of the aqueous urea solution. Further, the tooth top clearances T and side surface clearances S differ within the range of allowable error for each specimen of gear pump 64. Further, the viscosity μ of the aqueous urea solution changes according to the temperature of the aqueous urea solution as it changes according to the usage environment. For this reason, even if opening the aqueous urea solution injector 62 to inject aqueous urea solution in the state where the aqueous urea solution pressure P is controlled to a certain set pressure, due to the individual differences in gear pumps 64 and the effects of changes in the usage environment, the flow rate of the aqueous urea solution injected from the aqueous urea solution injector 62 does not become constant but fluctuates within a certain set range. For this reason, the amount of drop of the aqueous urea solution pressure P when the aqueous urea solution injector 62 is opened and the aqueous urea solution is injected also fluctuates within a certain constant range, so with the above-mentioned conventional method, it was not possible to reduce the width of the predetermined range to a certain constant amount or less.

Therefore, to quickly and precisely detect the first abnormality or the second abnormality, it is necessary to eliminate the effects of such tooth top clearances T or side surface clearances S and the viscosity μ of the aqueous urea solution. Here, if the pump rotational speed N and aqueous urea solution pressure P before aqueous urea solution injection are respectively $N_0$ and $P_0$, the actual discharge flow rate $Q_0$ before aqueous urea solution injection can be expressed by the following equation (5):

[Equation 5]

$$Q_0 = (1+c) \cdot K_n \cdot V_{th} \cdot N_0 - (K_S \cdot S^3 + K_T \cdot T^3) \cdot \frac{P_0}{\mu} \qquad (5)$$

Further, if the pump rotational speed N and aqueous urea solution pressure P during aqueous urea solution injection are $N_1$ and $P_1$, the actual discharge flow rate $Q_1$ before aqueous urea solution injection can be expressed by the following equation (6):

[Equation 6]

$$Q_1 = (1+c) \cdot K_n \cdot V_{th} \cdot N_1 - (K_S \cdot S^3 + K_T \cdot T^3) \cdot \frac{P_1}{\mu} \qquad (6)$$

Therefore, if obtaining the difference between the actual discharge flow rate $Q_1$ during aqueous urea solution injection and the actual discharge flow rate $Q_0$ before aqueous urea solution injection when making the aqueous urea solution pressure $P_1$ during aqueous urea solution injection increase to the aqueous urea solution pressure $P_0$ before aqueous urea solution injection, the second term at the right side of equation (5) and the second term at the right side of equation (6) cancel each other out resulting in the following equation (7):

[Equation 7]

$$Q_1 - Q_0 = (1+c) \cdot K_n \cdot V_{th} \cdot (N_1 - N_0) \qquad (7)$$

As shown in this equation (7), the difference ΔN (=$N_1$−$N_0$) between the pump rotational speed $N_1$ when making the aqueous urea solution pressure $P_1$ during aqueous urea solution injection increase to the aqueous urea solution pressure $P_0$ before aqueous urea solution injection and the pump rotational speed $N_0$ before aqueous urea solution injection (below, referred to as the "pump rotational speed difference") becomes constant without being affected by the tooth top clearances T and side surface clearances S and the viscosity μ of the aqueous urea solution.

Further, if the first abnormality has occurred, the pump rotational speed $N_1$ when making the aqueous urea solution pressure $P_1$ during aqueous urea solution injection increase to the aqueous urea solution pressure $P_0$ before aqueous urea solution injection becomes lower than the pump rotational speed at normal times by exactly the amount by which the amount of urea injection is insufficient with respect to the target amount of urea injection. Therefore, the pump rotational speed difference ΔN becomes smaller than the value at normal times.

Further, if the second abnormality has occurred, the pump rotational speed $N_1$ when making the aqueous urea solution pressure $P_1$ during aqueous urea solution injection increase to the aqueous urea solution pressure $P_0$ before aqueous urea solution injection becomes higher than the pump rotational speed at normal times by exactly the amount by which the amount of urea injection is in excess with respect to the target amount of urea injection. Therefore, the pump rotational speed difference ΔN becomes larger than the value at normal times.

Figure 3:
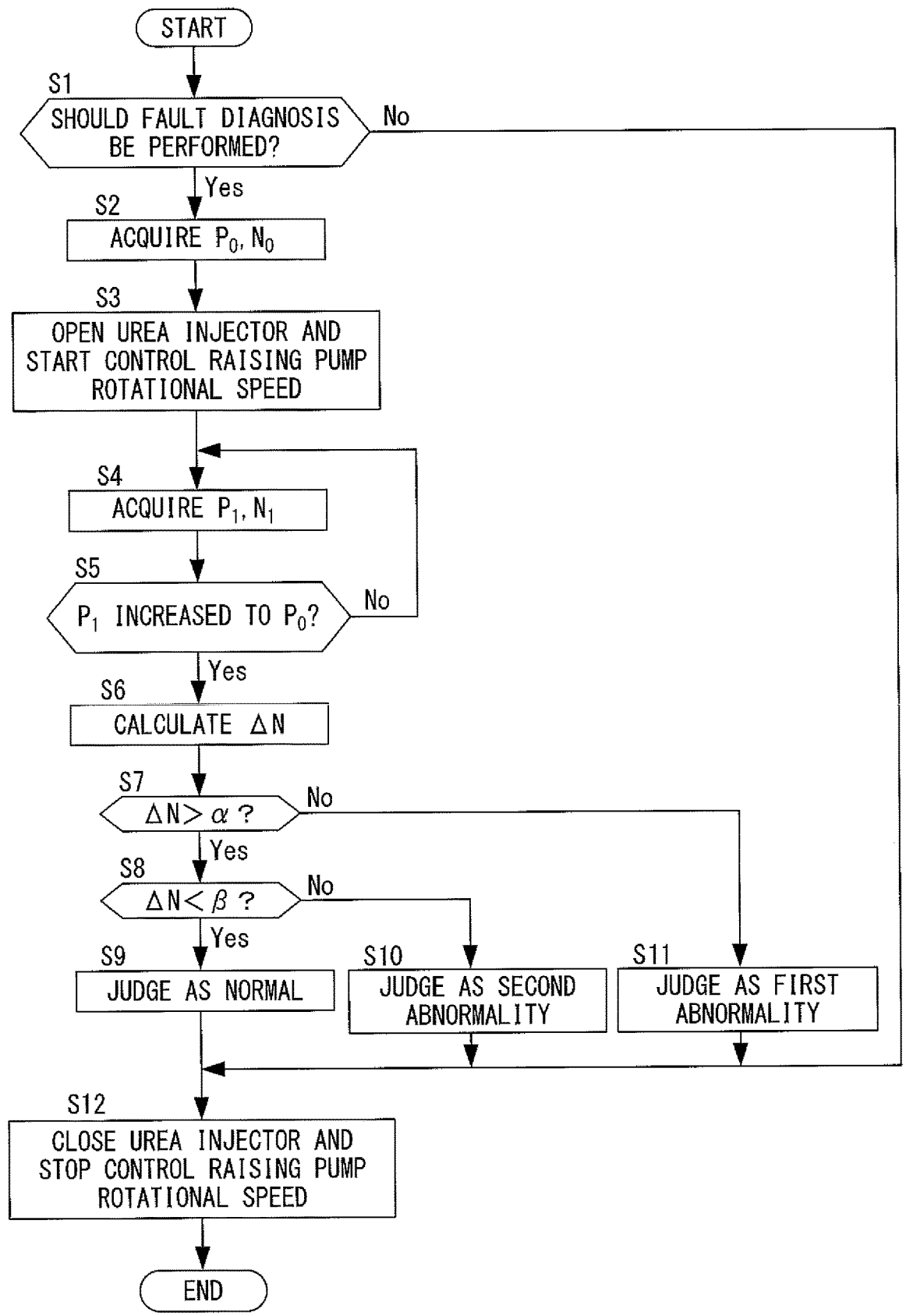
FIG. 3 is a flow chart for explaining fault diagnosis of the aqueous urea solution feed system according to the first embodiment of the present disclosure.

Therefore, the present embodiment was made to judge if the first abnormality or the second abnormality has occurred based on the pump rotational speed difference ΔN (=$N_1$−$N_0$) comprised of the difference between the pump rotational speed $N_1$ when making the aqueous urea solution pressure $P_1$ during aqueous urea solution injection increase to the aqueous urea solution pressure $P_0$ before aqueous urea solution injection and the pump rotational speed $N_0$ before aqueous urea solution injection FIG. 3 is a flow chart for explaining fault diagnosis of the aqueous urea solution feed system according to the present embodiment.

At step S1, the electronic control unit 200 judges if the fault diagnosis of the aqueous urea solution feed system should be performed. The electronic control unit 200 proceeds to the processing of step S2 if the fault diagnosis of the aqueous urea solution feed system should be performed. On the other hand, the electronic control unit 200 ends the current processing if the fault diagnosis of the aqueous urea solution feed system should not be performed. The electronic control unit 200, for example, judges that abnormality of the aqueous urea solution feed system should be checked for when abnormality of the aqueous urea solution feed system has still not been checked for in one trip of the vehicle or when there is no abnormality in the related parts.

At step S2, the electronic control unit 200 acquires the aqueous urea solution pressure $P_0$ and pump rotational speed $N_0$ before aqueous urea solution injection. The aqueous urea solution pressure $P_0$ and pump rotational speed $N_0$ before aqueous urea solution injection acquired at step S2 may be the instant values of the aqueous urea solution pressure and pump rotational speed before aqueous urea solution injection detected at the present point of time by the pressure sensor 67 and rotational speed sensor 68 or may be the average values of the aqueous urea solution pressure and pump rotational speed before aqueous urea solution injection detected by the pressure sensor 67 and rotational speed sensor 68 over a certain fixed time period of for example the past several seconds from the present point of time.

In the present embodiment, as the aqueous urea solution pressure $P_0$ and pump rotational speed $N_0$ before aqueous urea solution injection, the average values of these are made to be acquired. This is because, as shown in the later explained FIG. 4, the aqueous urea solution pressure pulsates without assuming a constant value due to the characteristic of the gear pump 64 of successively transporting the aqueous urea solution inside the tooth trough spaces 647 to the discharge port 642 side. Further, this is because sometimes the pump rotational speed will not take a certain value due to the effects of vibration etc. By acquiring not the instant values, but the average values of the aqueous urea solution pressure $P_0$ and pump rotational speed $N_0$ before aqueous urea solution injection, it is possible to reduce such effects of pulsation or vibration and possible to improve the accuracy of the acquired aqueous urea solution pressure $P_0$ and pump rotational speed $N_0$ before aqueous urea solution injection.

At step S3, the electronic control unit 200 opens the aqueous urea solution injector 62 to start the injection of the aqueous urea solution and starts the control for raising the pump rotational speed for making the aqueous urea solution pressure which had fallen due to the start of the injection of the aqueous urea solution increase to the aqueous urea solution pressure $P_0$ before aqueous urea solution injection.

At step S4, the electronic control unit 200 acquires the aqueous urea solution pressure $P_1$ and pump rotational speed $N_1$ during aqueous urea solution injection. The aqueous urea solution pressure $P_1$ and pump rotational speed $N_1$ during aqueous urea solution injection acquired at step S4 may also be the instant values of the aqueous urea solution pressure and pump rotational speed during aqueous urea solution injection detected at the present point of time by the pressure sensor 67 and rotational speed sensor 68 or may be the average values of the aqueous urea solution pressure and pump rotational speed during aqueous urea solution injection detected by the pressure sensor 67 and rotational speed sensor 68 over a certain fixed time period of for example the past several seconds from the present point of time.

At step S5, the electronic control unit 200 judges if the aqueous urea solution pressure $P_1$ during aqueous urea solution injection acquired at step S4 has increased to the aqueous urea solution pressure $P_0$ before aqueous urea solution injection acquired at step S2. The electronic control unit 200 proceeds to the processing of step S6 if the aqueous urea solution pressure $P_1$ during aqueous urea solution injection increases to the aqueous urea solution pressure $P_0$ before aqueous urea solution injection. On the other hand, the electronic control unit 200 again performs the processing of step S4 after a certain time if the aqueous urea solution pressure $P_1$ during aqueous urea solution injection has not increased to the aqueous urea solution pressure $P_0$ before aqueous urea solution injection.

Note that, in the present embodiment, at step S4, it is judged if the aqueous urea solution pressure $P_1$ during aqueous urea solution injection has increased to the aqueous urea solution pressure $P_0$ before aqueous urea solution injection, but the disclosure is not limited to this. For example, it is also possible to judge that the aqueous urea solution pressure $P_1$ during aqueous urea solution injection has increased to the aqueous urea solution pressure $P_0$ before aqueous urea solution injection when the aqueous urea solution pressure $P_1$ during aqueous urea solution injection has become a value smaller by a certain extent or a value larger by a certain extent than the aqueous urea solution pressure $P_0$ before aqueous urea solution injection.

At step S6, the electronic control unit 200 calculates the pump rotational speed difference $\Delta N$ comprised of the difference between the pump rotational speed $N_1$ during aqueous urea solution injection acquired at step S4 and the pump rotational speed $N_0$ before aqueous urea solution injection acquired at step S2.

At step S7, the electronic control unit 200 judges if the pump rotational speed difference $\Delta N$ is larger than a threshold value $\alpha$ for judging the first abnormality (below, referred to as the "first threshold value"). The first threshold value $\alpha$ is a value smaller than the pump rotational speed difference $\Delta N$ at normal times. The electronic control unit 200 judges that the first abnormality has not occurred and proceeds to the processing of step S8 if the pump rotational speed difference $\Delta N$ is larger than the first threshold value $\alpha$. On the other hand, the electronic control unit 200 judges that the first abnormality has occurred and proceeds to the processing of step S11 if the pump rotational speed difference $\Delta N$ is the first threshold value $\alpha$ or less.

At step S8, the electronic control unit 200 judges if the pump rotational speed difference $\Delta N$ is less than a threshold value $\beta$ for judging the second abnormality (below, referred to as the "second threshold value"). The second threshold value $\beta$ is a value larger than the pump rotational speed difference $\Delta N$ at normal times. The electronic control unit 200 judges that the second abnormality has not occurred and proceeds to the processing of step S9 if the pump rotational speed difference $\Delta N$ is less than the second threshold value $\beta$. On the other hand, the electronic control unit 200 judges that the second abnormality has occurred and proceeds to the processing of step S10 if the pump rotational speed difference $\Delta N$ is the second threshold value $\beta$ or more.

At step S9, the electronic control unit 200 judges that neither a first abnormality nor a second abnormality has occurred and that the aqueous urea solution feed system is normal.

At step S10, the electronic control unit 200 judges that the second abnormality has occurred at the aqueous urea solution feed system.

At step S11, the electronic control unit 200 judges that the first abnormality has occurred at the aqueous urea solution feed system.

At step S12, the aqueous urea solution injector 62 is closed to stop the injection of the aqueous urea solution and control for raising the pump rotational speed is stopped.

Figure 4:
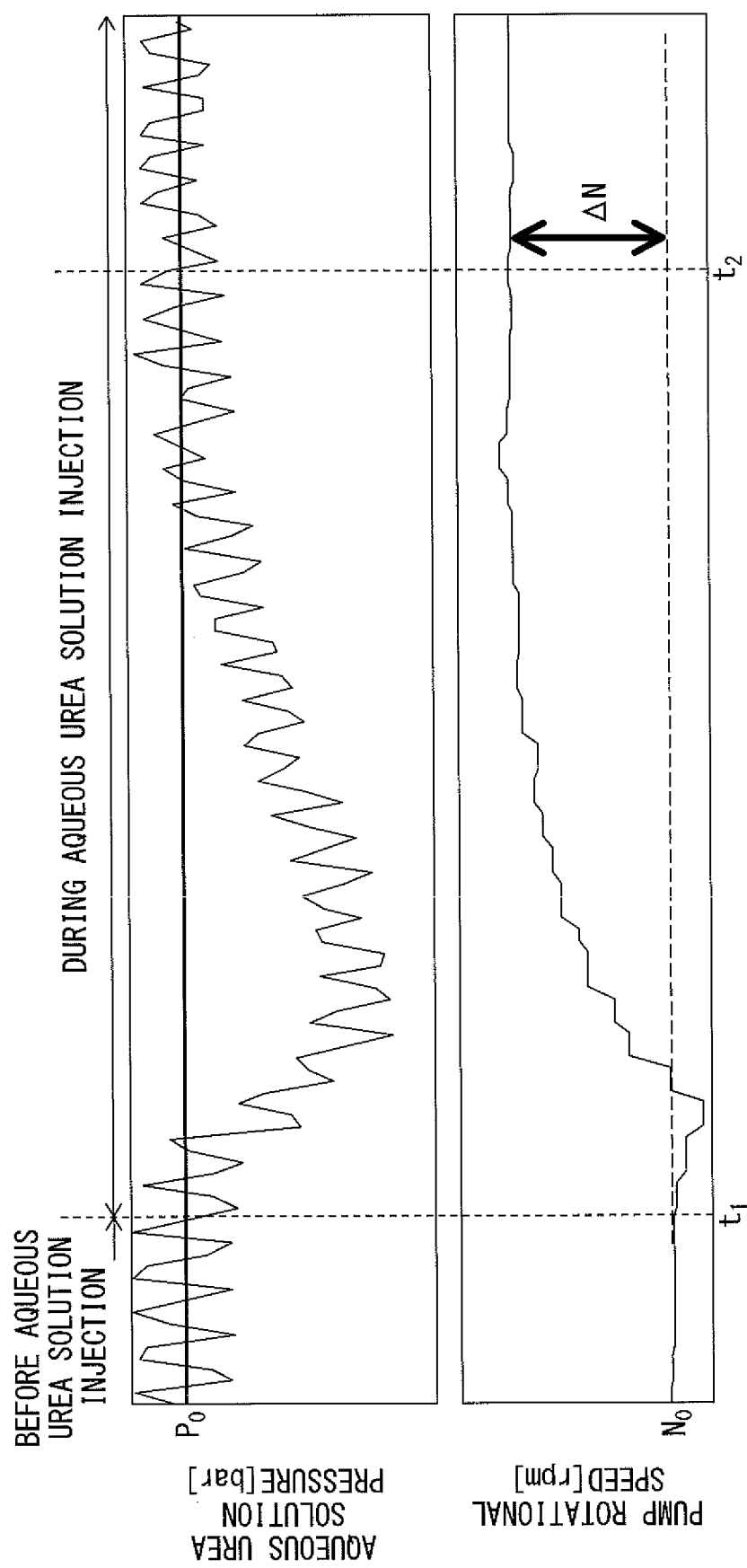
FIG. 4 is a time chart for explaining a fault diagnosis operation of the aqueous urea solution feed system according to the first embodiment of the present disclosure.

FIG. 4 is a time chart for explaining the operation of fault diagnosis of the aqueous urea solution feed system according to the present embodiment.

Before the time t1, the pump rotational speed is controlled to be constant, therefore the aqueous urea solution pressure is also controlled to be constant. Note that, the aqueous urea solution pressure pulsates because, as explained above, of the characteristic of the gear pump 64 which successively transporting the aqueous urea solution inside the tooth trough spaces 647 to the discharge port 642 side.

If, at the time t1, it is judged that fault diagnosis of the aqueous urea solution feed system should be performed, as the aqueous urea solution pressure $P_0$ and pump rotational speed $N_0$ before aqueous urea solution injection, the average values of the aqueous urea solution pressure and pump rotational speed detected by the pressure sensor 67 and rotational speed sensor 68 over the past several seconds up to the time t1 are acquired and the aqueous urea solution injector 62 is opened, the injection of the aqueous urea solution is started, and the aqueous urea solution pressure starts to fall.

Further, control for raising the pump rotational speed is started before the aqueous urea solution pressure $P_1$ during aqueous urea solution injection in the state of opening the aqueous urea solution injector 62, that is, the state of continuing injection of the aqueous urea solution, becomes the aqueous urea solution pressure $P_0$ before aqueous urea solution injection and the aqueous urea solution pressure $P_1$ and pump rotational speed $N_1$ during aqueous urea solution injection are respectively acquired.

If at the time t2, the aqueous urea solution pressure $P_1$ during aqueous urea solution injection detected by the pressure sensor 67 over the past several seconds until the time t2 increases to the aqueous urea solution pressure $P_0$ before aqueous urea solution injection, the pump rotational speed difference $\Delta N$ comprised of the difference between the pump rotational speed $N_1$ during aqueous urea solution injection detected by the rotational speed sensor 68 over the past several seconds until the time t2 and the pump rotational speed $N_0$ before aqueous urea solution injection is calculated.

As explained above, if the first abnormality has occurred, the pump rotational speed $N_1$ when making the aqueous urea solution pressure $P_1$ during aqueous urea solution injection increase to the aqueous urea solution pressure $P_0$ before aqueous urea solution injection becomes lower than the pump rotational speed at normal times by exactly the amount by which the amount of urea injection is insufficient with respect to the target amount of urea injection. Therefore, it can be judged that the first abnormality has occurred if the pump rotational speed difference $\Delta N$ becomes lower than the value at normal times.

Further, if the second abnormality has occurred, the pump rotational speed $N_1$ when making the aqueous urea solution pressure $P_1$ during aqueous urea solution injection increase to the aqueous urea solution pressure $P_0$ before aqueous urea solution injection becomes higher than the pump rotational speed at normal times by exactly the amount by which the amount of urea injection is in excess with respect to the target amount of urea injection. Therefore, it can be judged that the second abnormality has occurred if the pump rotational speed difference $\Delta N$ becomes higher than the second threshold value $\beta$.

Further, as explained above, this pump rotational speed difference $\Delta N$ is not affected by the tooth top clearances T or side surface clearances S or the viscosity $\mu$ of the aqueous urea solution. For this reason, it is possible to set the first threshold value $\alpha$ and second threshold value $\beta$ to values close to the pump rotational speed difference $\Delta N$ when the aqueous urea solution feed system is normal. Therefore, it is possible to detect a first abnormality or a second abnormality early with a good precision.

The aqueous urea solution feed system 60 (fluid feed system) according to the present embodiment explained above is provided with a gear pump 64, an aqueous urea solution injector 62 (injection device) for injecting the aqueous urea solution (fluid) discharged from the gear pump 64, a high pressure side feed pipe 63b (fluid passage) connecting the gear pump 64 and the aqueous urea solution injector 62, an aqueous urea solution return pipe 65 (discharge passage) connected to the high pressure side feed pipe 63b and discharging excess aqueous urea solution in the aqueous urea solution discharged from the gear pump 64, a pressure sensor 67 (pressure detector) provided at the high pressure side feed pipe 63b and detecting an aqueous urea solution pressure comprised of a pressure of the aqueous urea solution discharged from the gear pump 64, and a rotational speed sensor 68 (rotational speed detector) detecting the pump rotational speed comprised of the rotational speed of the gear pump 64.

Further, the electronic control unit 200 (fault diagnosis device) for performing fault diagnosis of the aqueous urea solution feed system 60 is configured comprising a first acquiring part acquiring an aqueous urea solution pressure and pump rotational speed at a certain point of time before aqueous urea solution injection in which an aqueous urea solution injector 62 is not injecting fluid or average values of the aqueous urea solution pressure and pump rotational speed in a certain time period as the aqueous urea solution pressure $P_0$ and pump rotational speed $N_0$ before aqueous urea solution injection, a second acquiring part acquiring a fluid pressure and pump rotational speed at a certain point of time during aqueous urea solution injection in which the aqueous urea solution injector 62 is injecting fluid or the average values of the aqueous urea solution pressure and pump rotational speed in a certain time period as the aqueous urea solution pressure $P_1$ and pump rotational speed $N_1$ during aqueous urea solution injection, a pump rotational speed difference calculating part calculating a pump rotational speed difference $\Delta N$ comprised of a difference between the pump rotational speed $N_1$ during aqueous urea solution injection and the pump rotational speed $N_0$ before aqueous urea solution injection when the fluid pressure $P_0$ before aqueous urea solution injection and the aqueous urea solution pressure $P_1$ during aqueous urea solution injection match, and an abnormality judging part judging based on the pump rotational speed difference $\Delta N$ whether an abnormality has occurred in the flow rate of the aqueous urea solution injected from the aqueous urea solution injector 62.

More specifically, the abnormality judging part is configured so as to judge that an abnormality of a flow rate of the aqueous urea solution injected from the aqueous urea solution injector 62 decreasing from normal, that is, the first abnormality, has occurred if the pump rotational speed difference ΔN is a predetermined first threshold value α smaller than the normal value when there is no abnormality in the aqueous urea solution feed system 60 or is less. Further, the abnormality judging part is configured so as to judge that an abnormality of the flow rate of the aqueous urea solution injected from the aqueous urea solution injector 62 increasing from normal, that is, the second abnormality, has occurred if the pump rotational speed difference ΔN is a predetermined second threshold value β larger than the normal value when there is no abnormality in the aqueous urea solution feed system 60 or is more.

As explained above, the pump rotational speed difference ΔN comprised of the difference between the pump rotational speed $N_1$ during aqueous urea solution injection and the pump rotational speed $N_0$ before aqueous urea solution injection when the aqueous urea solution pressure $P_1$ during aqueous urea solution injection becomes the fluid pressure $P_0$ before aqueous urea solution injection becomes a fixed value not affected by the tooth top clearances T or side surface clearances S or the viscosity μ of the aqueous urea solution if no first abnormality and second abnormality occurs.

For this reason, by judging if an abnormality has occurred in the flow rate of the aqueous urea solution injected from the aqueous urea solution injector 62, that is, if the first abnormality or second abnormality has occurred, based on the pump rotational speed difference ΔN, it is possible to judge if the first abnormality or second abnormality has occurred with a good accuracy. Further, the first threshold value α and the second threshold value β can be set to values close to the pump rotational speed difference ΔN when the aqueous urea solution feed system is normal. Therefore, it is possible to detect the first abnormality or the second abnormality early with a good accuracy.

Second Embodiment

Next, a second embodiment of the present disclosure will be explained. The present embodiment differs from the first embodiment in the content of the fault diagnosis of the aqueous urea solution feed system 60. Below, this point of difference will be focused on in the explanation.

In the fault diagnosis of the aqueous urea solution feed system 60 according to the above-mentioned first embodiment, it was necessary to judge whether the aqueous urea solution pressure $P_1$ during aqueous urea solution injection had increased to the aqueous urea solution pressure $P_0$ before aqueous urea solution injection. In other words, while the aqueous urea solution pressure $P_1$ during aqueous urea solution injection was increased to the aqueous urea solution pressure $P_0$ before aqueous urea solution injection, it was necessary to continue injecting aqueous urea solution and therefore it was necessary to continue injecting aqueous urea solution over a relatively long period of time. Therefore, the amount of consumption of the aqueous urea solution during fault diagnosis became greater. Further, when not possible to continue injecting aqueous urea solution over a long period of time, it was not possible to perform fault diagnosis, so the frequency of performing fault diagnosis was liable to become lower.

Therefore, in the fault diagnosis of the aqueous urea solution feed system 60 according to the present embodiment, injection of the aqueous urea solution was stopped at the point of time of injecting the aqueous urea solution for a predetermined time period. That is, injection of the aqueous urea solution was stopped before the aqueous urea solution pressure $P_1$ during aqueous urea solution injection increases to the aqueous urea solution pressure $P_0$ before aqueous urea solution injection. Further, this embodiment calculates the aqueous urea solution pressure difference ΔP ($=P_0-P_1$) comprised of the difference between the aqueous urea solution pressure $P_0$ before aqueous urea solution injection and the aqueous urea solution pressure $P_1$ during aqueous urea solution injection right before stopping injection of the aqueous urea solution, calculates the pump rotational speed difference (below, referred to as the "stopping pump rotational speed difference") ΔNs ($=N_1-N_0$) comprised of the difference between the pump rotational speed $N_1$ during aqueous urea solution injection right before stopping the injection of the aqueous urea solution and the pump rotational speed $N_0$ before aqueous urea solution injection, and corrects the stopping pump rotational speed difference ΔNs based on the aqueous urea solution pressure difference ΔP to estimate the pump rotational speed difference ΔN when the aqueous urea solution pressure $P_1$ during aqueous urea solution injection increases to the aqueous urea solution pressure $P_0$ before aqueous urea solution injection.

Figure 5:
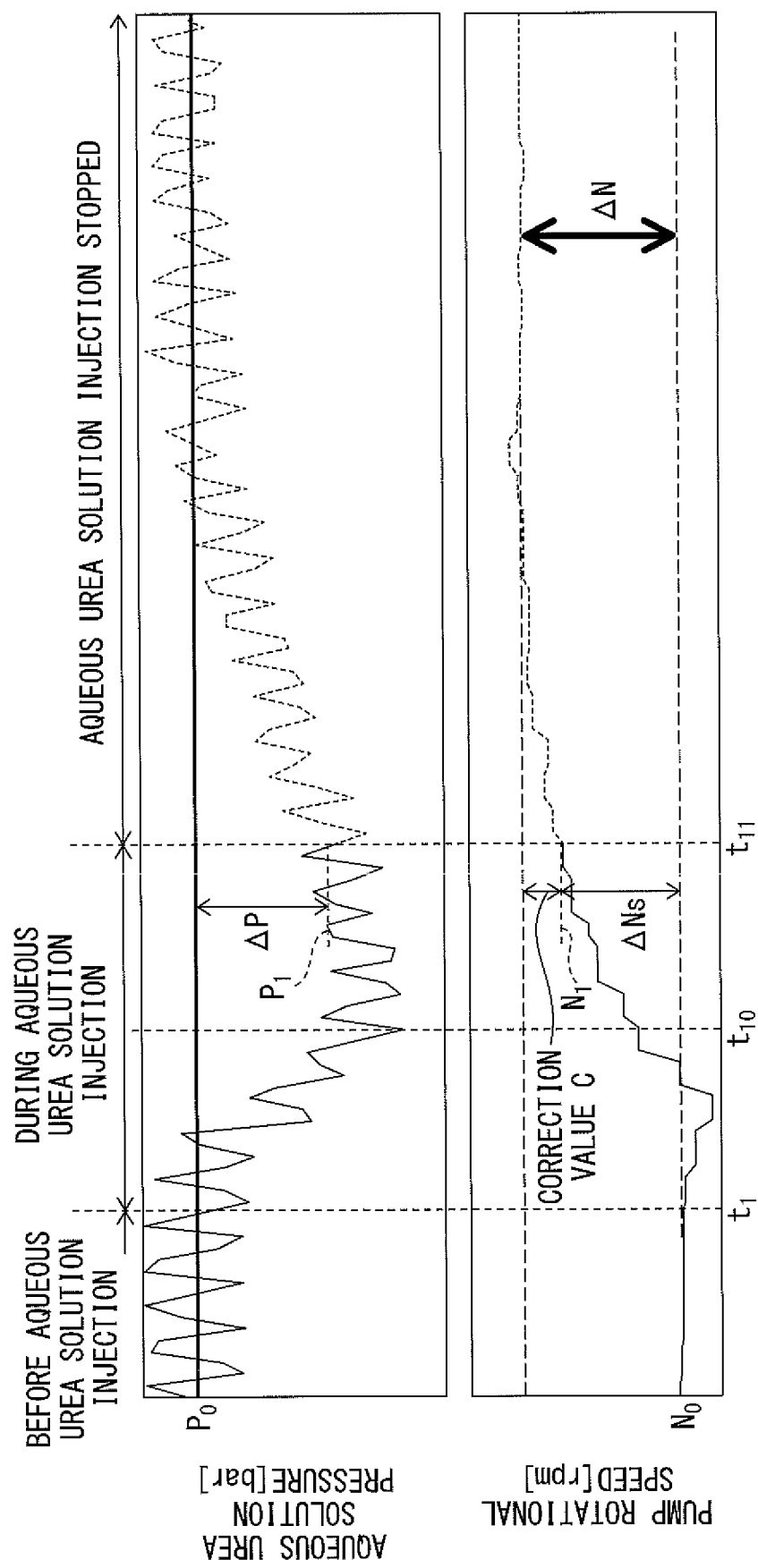
FIG. 5 is a diagram for explaining a method of estimating a pump rotational speed difference ΔN.

FIG. 5 is a view explaining the method of estimating this pump rotational speed difference ΔN.

If stopping the injection of the aqueous urea solution before the aqueous urea solution pressure $P_1$ during aqueous urea solution injection increases to the aqueous urea solution pressure $P_0$ before aqueous urea solution injection, for example, the time t11, the aqueous urea solution pressure $P_1$ and pump rotational speed $N_1$ during aqueous urea solution injection right before stopping injection of the aqueous urea solution will become as shown in FIG. 5. Further, the aqueous urea solution pressure difference ΔP at this time and the stopping pump rotational speed difference ΔNs will also become as shown in FIG. 5.

Here, if making the difference between the pump rotational speed difference ΔN when the aqueous urea solution pressure $P_1$ during aqueous urea solution injection increases to the aqueous urea solution pressure $P_0$ before aqueous urea solution injection and the stopping pump rotational speed difference ΔNs the correction value C for the stopping pump rotational speed difference ΔNs, it is possible to estimate the pump rotational speed difference ΔN if calculating this correction value C and adding the correction value C to the stopping pump rotational speed difference ΔNs.

Therefore, if considering the correction value C added to the stopping pump rotational speed difference ΔNs, this correction value C, as shown in FIG. 5, tends to become smaller at the time t10 after the aqueous urea solution pressure falls to the minimal value (after the opening amount of the aqueous urea solution injector 62 becomes maximum) since the stopping pump rotational speed difference ΔNs becomes larger toward the pump rotational speed difference ΔN the smaller the aqueous urea solution pressure difference ΔP.

Further, the pump rotational speed $N_1$ when the aqueous urea solution pressure $P_1$ during aqueous urea solution injection increases to the aqueous urea solution pressure $P_0$ before aqueous urea solution injection becomes higher the higher the aqueous urea solution temperature Tu and the smaller the viscosity μ of the aqueous urea solution since, as will be understood from the above-mentioned equation (4), the actual discharge flow rate Q decreases. Therefore, the pump rotational speed difference ΔN when the aqueous urea solution pressure $P_1$ during aqueous urea solution injection increases to the aqueous urea solution pressure $P_0$ before aqueous urea solution injection tends to become larger the higher the aqueous urea solution temperature Tu and the smaller the viscosity μ of the aqueous urea solution. This is because if the pump rotational speed is the same, the actual discharge flow rate Q is decreased and the aqueous urea solution pressure falls the smaller the viscosity μ of the aqueous urea solution, so to make this increase to the same pressure, it is necessary to increase the pump rotational speed the higher the viscosity μ of the aqueous urea solution. Therefore, if considering also this viscosity μ of the aqueous urea solution, the correction value C tends to become larger the higher the aqueous urea solution temperature Tu.

Therefore, in the present embodiment, the relationship between the aqueous urea solution pressure difference ΔP and aqueous urea solution temperature Tu when the aqueous urea solution feed system 60 is normal and the correction value C at the different points of time before the aqueous urea solution pressure $P_1$ during aqueous urea solution injection increases to the aqueous urea solution pressure $P_0$ before aqueous urea solution injection is found in advance by experiments etc. and mapped. Referring to this map (see FIG. 7), the correction value C is calculated based on the aqueous urea solution pressure difference ΔP and aqueous urea solution temperature Tu. The calculated correction value C is added to the stopping pump rotational speed difference ΔNs to estimate the pump rotational speed difference ΔN.

Figure 6:
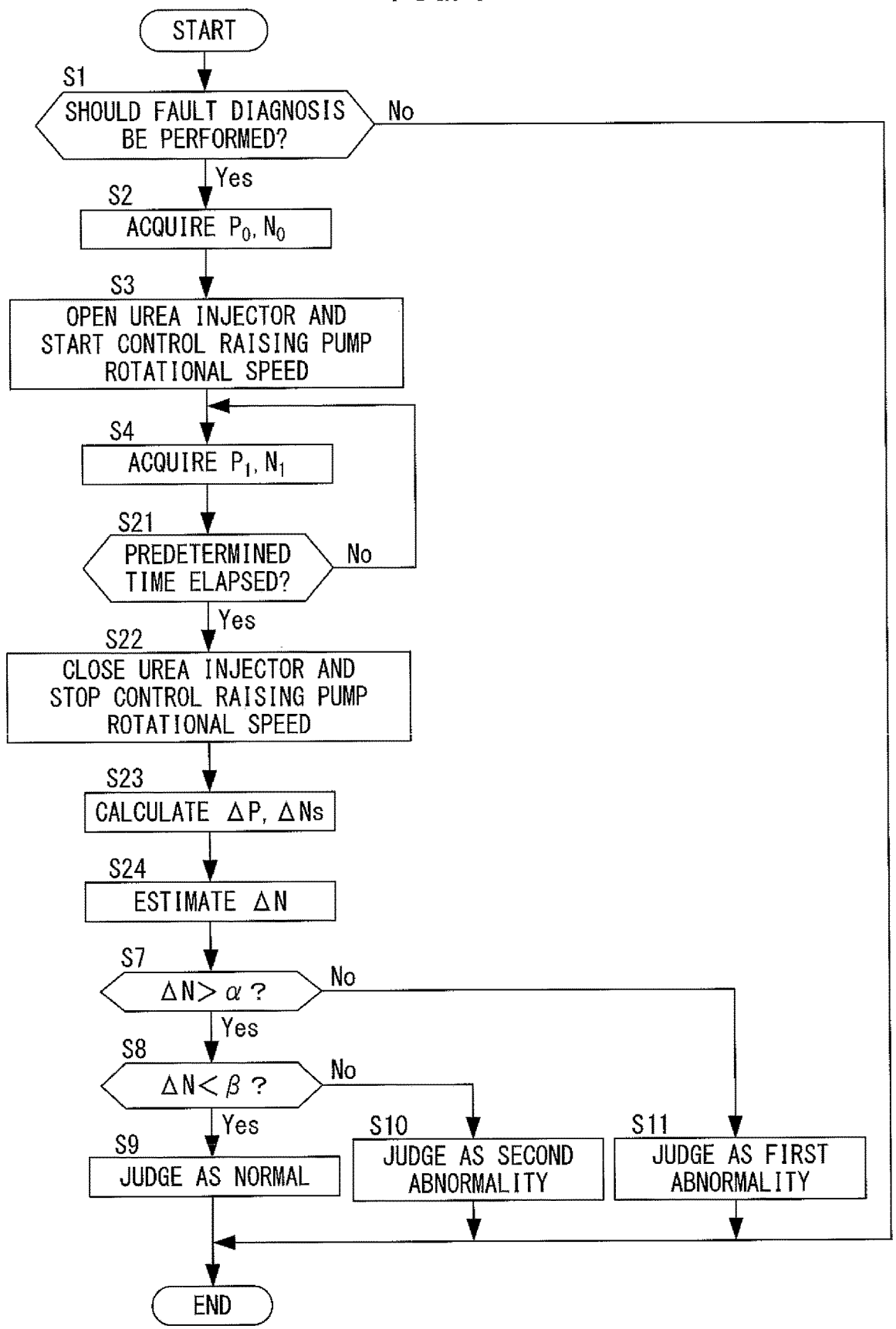
FIG. 6 is a flow chart for explaining fault diagnosis of the aqueous urea solution feed system according to a second embodiment of the present disclosure.

FIG. 6 is a flow chart for explaining fault diagnosis of the aqueous urea solution feed system 60 according to the present embodiment. Note that in FIG. 6, the contents of the processing of step S1 to step S4 and step S7 to step S11 are similar to the first embodiment, so here explanations will be omitted.

At step S21, the electronic control unit 200 judges if a predetermined time has elapsed from when opening the aqueous urea solution injector 62. The present embodiment sets the predetermined time to a time longer than the time from when starting to open the aqueous urea solution injector 62 to when the opening amount of the aqueous urea solution injector 62 becomes maximum and shorter than the time taken until the aqueous urea solution pressure $P_1$ during aqueous urea solution injection increases to the aqueous urea solution pressure $P_0$ before aqueous urea solution injection. The electronic control unit 200 proceeds to the processing of step S22 if a predetermined time has elapsed from when opening the aqueous urea solution injector 62. On the other hand, the electronic control unit 200 again performs the processing of step S4 if a predetermined time has not elapsed from when opening the aqueous urea solution injector 62.

At step S22, the electronic control unit 200 closes the aqueous urea solution injector 62 to stop the injection of the aqueous urea solution and stop the control for raising the pump rotational speed.

At step S23, the electronic control unit 200 calculates the aqueous urea solution pressure difference ΔP ($=P_0-P_1$) comprised of the difference between the aqueous urea solution pressure $P_0$ before aqueous urea solution injection acquired at step S2 and the aqueous urea solution pressure $P_1$ during aqueous urea solution injection right before stopping the injection of the aqueous urea solution acquired at step S4. Further, the electronic control unit 200 calculates the stopping pump rotational speed difference ΔNs ($=N_1-N_0$) comprised of the difference between the pump rotational speed $N_1$ during aqueous urea solution injection right before stopping the injection of the aqueous urea solution acquired at step S4 and the pump rotational speed $N_0$ before aqueous urea solution injection obtained at step S2.

Figure 7:
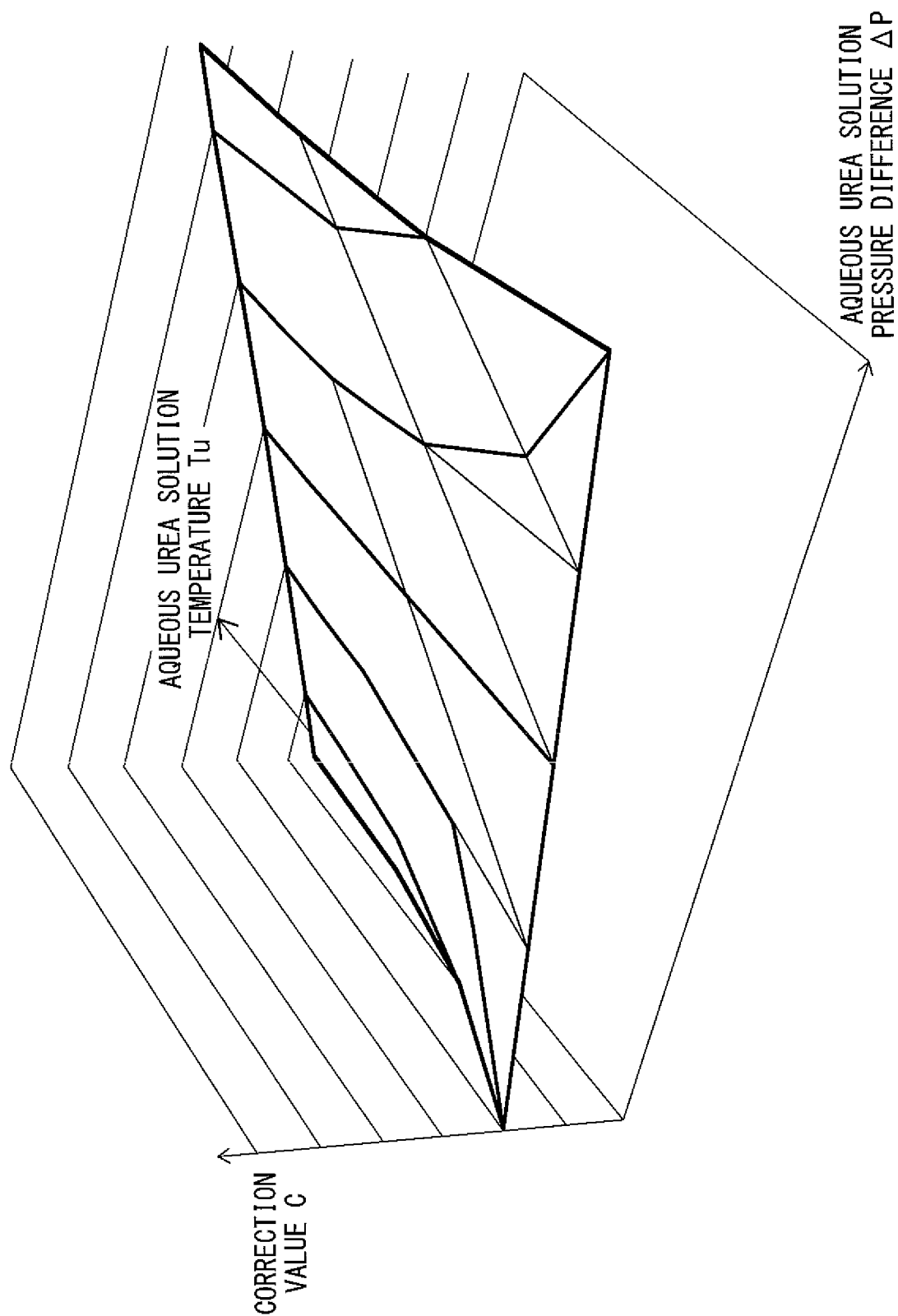
FIG. 7 is a map for calculating a correction value C based on an aqueous urea solution pressure difference and an aqueous urea solution temperature.

At step S24, the electronic control unit 200 calculates the estimated value of the pump rotational speed difference ΔN when the aqueous urea solution pressure $P_1$ during aqueous urea solution injection increases to the aqueous urea solution pressure $P_0$ before aqueous urea solution injection. In the present embodiment, the electronic control unit 200 refers to the map of FIG. 7 prepared in advance by experiments etc. to calculate the correction value C based on the aqueous urea solution pressure difference ΔP and the aqueous urea solution temperature Tu and adds the correction value C to the stopping pump rotational speed difference ΔNs to calculate the estimated value of the pump rotational speed difference ΔN. As shown in the map of FIG. 7, the larger the aqueous urea solution pressure difference ΔP becomes and, further, the higher the temperature T of the aqueous urea solution becomes, the larger the correction value C tends to become.

Note that, in the present embodiment, the electronic control unit 200 calculated the correction value C based on the aqueous urea solution pressure difference ΔP and the aqueous urea solution temperature Tu, but it is also possible to calculate the correction value C based only on the aqueous urea solution pressure difference ΔP.

According to the present embodiment explained above, the electronic control unit 200 (fault diagnosis device) for performing fault diagnosis of the aqueous urea solution feed system 60, in the same way as the above-mentioned first embodiment, is provided with a first acquiring part, a second acquiring part, a pump rotational speed difference calculating part, and an abnormality judging part.

Further, the pump rotational speed difference calculating part according to the present embodiment is provided with an estimated value calculating part calculating an estimated value of the pump rotational speed difference. The estimated value calculating part is provided with a fluid pressure difference calculating part calculating a fluid pressure difference ΔP comprised of a difference between a fluid pressure $P_0$ before aqueous urea solution injection and a fluid pressure $P_1$ during aqueous urea solution injection before the fluid pressure $P_0$ before the aqueous urea solution injection and the fluid pressure $P_1$ during aqueous urea solution injection match and a differential value calculating part calculating a stopping pump rotational speed difference ΔN comprised of a differential value between a pump rotational speed $N_1$ during aqueous urea solution injection and a pump rotational speed $N_0$ before aqueous urea solution injection before the fluid pressure $P_0$ before aqueous urea solution injection and the fluid pressure $P_1$ during aqueous urea solution injection match and is configured so as to correct the stopping pump rotational speed difference ΔNs to calculate the pump rotational speed difference ΔN based on the aqueous urea solution pressure difference ΔP.

More specifically, the estimated value calculating part is configured to calculate based on the aqueous urea solution pressure difference ΔP a correction value C which becomes larger the greater the aqueous urea solution pressure difference ΔP and to add the correction value C to the stopping pump rotational speed difference ΔNs and is configured to further increase the correction value C the higher the aqueous urea solution temperature T.

Due to this, for fault diagnosis, there is no need to continue to inject the aqueous urea solution over a long period of time, so it is possible to keep down the amount of consumption of aqueous urea solution during fault diagnosis and possible to keep the frequency of performing fault diagnosis from falling.

Third Embodiment

Next, a second embodiment of the present disclosure will be explained. The present embodiment differs from the second embodiment on the point of correcting the first threshold value α and second threshold value β based on the aqueous urea solution pressure difference ΔP. Below, this point of difference will be focused on in the explanation.

The above-mentioned second embodiment corrected the stopping pump rotational speed difference ΔNs based on aqueous urea solution pressure difference ΔP to thereby calculate the estimated value of the pump rotational speed difference ΔN and compared the estimated value of this pump rotational speed difference ΔN with the first threshold value α and second threshold value β for fault diagnosis of the aqueous urea solution feed system 60.

As opposed to this, the present embodiment corrects the first threshold value α and second threshold value β based on the aqueous urea solution pressure difference ΔP and compares the stopping pump rotational speed difference ΔNs with this corrected first threshold value α and second threshold value β for fault diagnosis of the aqueous urea solution feed system 60.

In the above-mentioned second embodiment, the correction value C calculated based on the aqueous urea solution pressure difference ΔP comprised of the difference between the aqueous urea solution pressure $P_0$ before aqueous urea solution injection and the aqueous urea solution pressure $P_1$ during aqueous urea solution injection right before stopping injection of the aqueous urea solution was a value corresponding to the difference of the pump rotational speed difference ΔN when the aqueous urea solution pressure $P_1$ during aqueous urea solution injection increased to the aqueous urea solution pressure $P_0$ before aqueous urea solution injection and the stopping pump rotational speed difference ΔNs.

For this reason, the second embodiment added this correction value C to the stopping pump rotational speed difference ΔNs to thereby calculate the estimated value of the pump rotational speed difference ΔN and compared the estimated value of this pump rotational speed difference ΔN with the first threshold value α and second threshold value β, but this is the same as comparing the stopping pump rotational speed difference ΔNs with the first correction threshold value αc (=α−C) and second correction threshold value βc (=β−C) obtained by subtracting the correction value C from the first threshold value α and second threshold value β. Therefore, the present embodiment corrects the first threshold value α and second threshold value β based on the aqueous urea solution pressure difference ΔP and compares the stopping pump rotational speed difference ΔNs with this corrected first threshold value α and second threshold value β. Below, the fault diagnosis of the aqueous urea solution feed system 60 according to the present embodiment will be explained.

Figure 8:
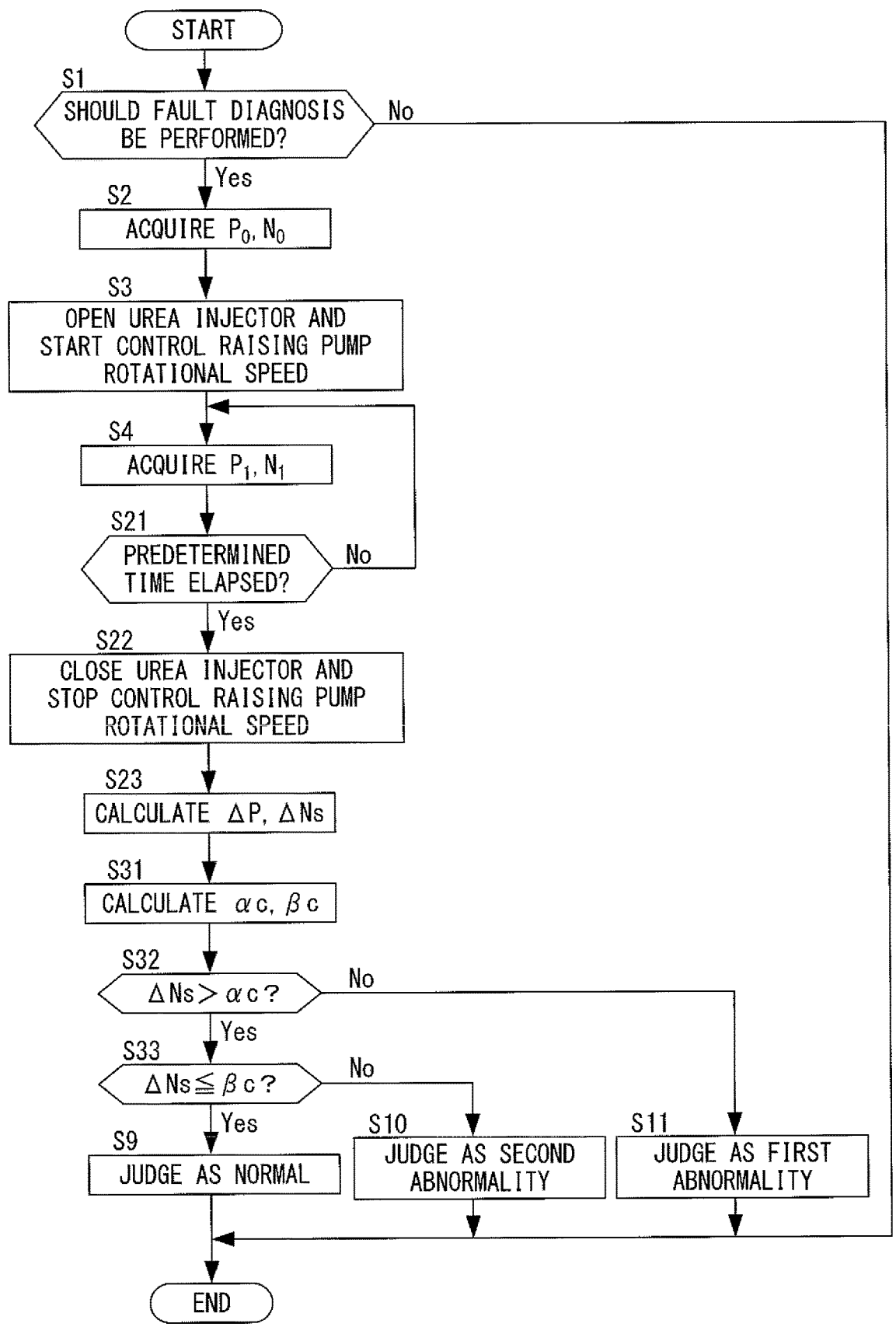
FIG. 8 is a flow chart for explaining fault diagnosis of the aqueous urea solution feed system according to a third embodiment of the present disclosure.

FIG. 8 is a flow chart explaining fault diagnosis of the aqueous urea solution feed system 60 according to the present embodiment. Note that, in FIG. 8, the contents of the processing of step S1 to step S4, step S9 to step S11, and step S21 to step S23 are similar to the first embodiment, so here the explanations will be omitted.

At step S31, the electronic control unit 200 calculates a first correction threshold value αc and a second correction threshold value βc. In the present embodiment, the electronic control unit 200 refers to the map of FIG. 7, calculates the correction value C based on the aqueous urea solution pressure difference ΔP and the aqueous urea solution temperature T, and subtracts this correction value C from the preset first threshold value α and second threshold value β to thereby calculate the first correction threshold value αc and second correction threshold value βc.

At step 32, the electronic control unit 200 judges if the stopping pump rotational speed difference ΔNs is larger than the first correction threshold value αc. The electronic control unit 200 judges that the first abnormality has not occurred and proceeds to the processing of step S33 if the stopping pump rotational speed difference ΔNs is larger than the first correction threshold value αc. On the other hand, the electronic control unit 200 judges that the first abnormality has occurred and proceeds to the processing of step S11 if the stopping pump rotational speed difference ΔNs is the first correction threshold value αc or less.

At step S33, the electronic control unit 200 judges if the stopping pump rotational speed difference ΔNs is less than the second correction threshold value βc. The electronic control unit 200 judges that the second abnormality has not occurred and proceeds to the processing of step S9 if the stopping pump rotational speed difference ΔNs is less than the second correction threshold value βc. On the other hand, the electronic control unit 200 judges that the second abnormality has occurred and proceeds to the processing of step S10 if the stopping pump rotational speed difference ΔNs is the second correction threshold value βc or more.

According to the present embodiment explained above, the electronic control unit 200 (fault diagnosis device) for performing fault diagnosis of the aqueous urea solution feed system 60, like in the above-mentioned first embodiment, is provided with a first acquiring part, second acquiring part, pump rotational speed difference calculating part, and abnormality judging part.

Further, the abnormality judging part according to the present embodiment is provided with a first correcting part correcting the first threshold α. The first correcting part is configured to correct the first threshold value α based on the aqueous urea solution pressure difference ΔP comprised of the difference between the fluid pressure $P_0$ before aqueous urea solution injection and the fluid pressure $P_1$ during aqueous urea solution injection before the fluid pressure $P_0$ before aqueous urea solution injection and the fluid pressure $P_1$ during aqueous urea solution injection match. More specifically, the first correcting part is configured to calculate based on the aqueous urea solution pressure difference ΔP a correction value C which becomes larger the greater the aqueous urea solution pressure difference ΔP and to subtract that correction value C from the first threshold value α and is configured to further increase the correction value C the higher the aqueous urea solution temperature T.

Further, the abnormality judging part according to the present embodiment is provided with a second correcting part correcting the second threshold value β. The second correcting part is configured to correct the second threshold value β based on the aqueous urea solution pressure difference ΔP comprised of the difference between the fluid pressure $P_0$ before aqueous urea solution injection and the fluid pressure $P_1$ during aqueous urea solution injection before the fluid pressure $P_0$ before aqueous urea solution injection and the fluid pressure $P_1$ during aqueous urea solution injection match. More specifically, the second correcting part is configured to calculate based on the aqueous urea solution pressure difference ΔP a correction value C which becomes larger the greater the aqueous urea solution pressure difference ΔP and to subtract that correction value C from the second threshold value β and is configured to further increase the correction value C the higher the aqueous urea solution temperature T.

Fourth Embodiment

Next, a fourth embodiment of the present disclosure will be explained. The present embodiment differs in content of the fault diagnosis of the aqueous urea solution feed system 60 from the first embodiment. Below, this point of difference will be focused on in the explanation.

The above-mentioned first embodiment judged whether a first abnormality and a second abnormality had occurred based on the pump rotational speed difference $\Delta N$ comprised of a difference between a pump rotational speed $N_1$ when increasing the aqueous urea solution pressure $P_1$ during aqueous urea solution injection to the aqueous urea solution pressure $P_0$ before aqueous urea solution injection and a pump rotational speed $N_0$ before aqueous urea solution injection.

As opposed to this, the present embodiment, for example, stores the aqueous urea solution pressure and pump rotational speed before aqueous urea solution injection at a certain point of time detected by the pressure sensor 67 and rotational speed sensor 68 when, for example, right after factory shipment or otherwise when in the initial state where it can be judged there is no abnormality in the aqueous urea solution feed system 60, as the initial aqueous urea solution pressure $P_3$ and the initial pump rotational speed $N_3$ during aqueous urea solution injection.

Further, when detecting abnormality of the aqueous urea solution feed system 60, in the same way as the first embodiment, it acquires the aqueous urea solution pressure $P_0$ and pump rotational speed $N_0$ before aqueous urea solution injection and calculates the difference between the initial pump rotational speed $N_3$ before aqueous urea solution injection and the pump rotational speed $N_0$ when the aqueous urea solution pressure $P_0$ before aqueous urea solution injection becomes the initial aqueous urea solution pressure $P_3$ before aqueous urea solution injection, as the pump rotational speed difference $\Delta N$.

At this time, if the pump rotational speed difference $\Delta N$ is smaller than normal, despite the pump rotational speed $N_0$ before aqueous urea solution injection being lower than the pump rotational speed at normal times (that is, the initial pump rotational speed $N_3$), the aqueous urea solution pressure $P_0$ before aqueous urea solution injection reaches the initial aqueous urea solution pressure $P_3$ before aqueous urea solution injection. For this reason, it can be judged that clogging of the aqueous urea solution has occurred due to foreign matter etc. in the high pressure side feed pipe 63b and in the aqueous urea solution return pipe 65 at the upstream side in the direction of flow of aqueous urea solution from the check valve 66.

On the other hand, if the pump rotational speed difference $\Delta N$ is larger than normal, despite the pump rotational speed $N_0$ before aqueous urea solution injection having risen to the pump rotational speed at normal times (that is, the initial pump rotational speed $N_3$), the aqueous urea solution pressure $P_0$ before aqueous urea solution injection does not reach the initial aqueous urea solution pressure $P_3$ before aqueous urea solution injection. For this reason, it can be judged that aqueous urea solution is leaking in the high pressure side feed pipe 63b and in the aqueous urea solution return pipe 65 at the upstream side in the direction of flow of aqueous urea solution from the check valve 66.

Figure 9:
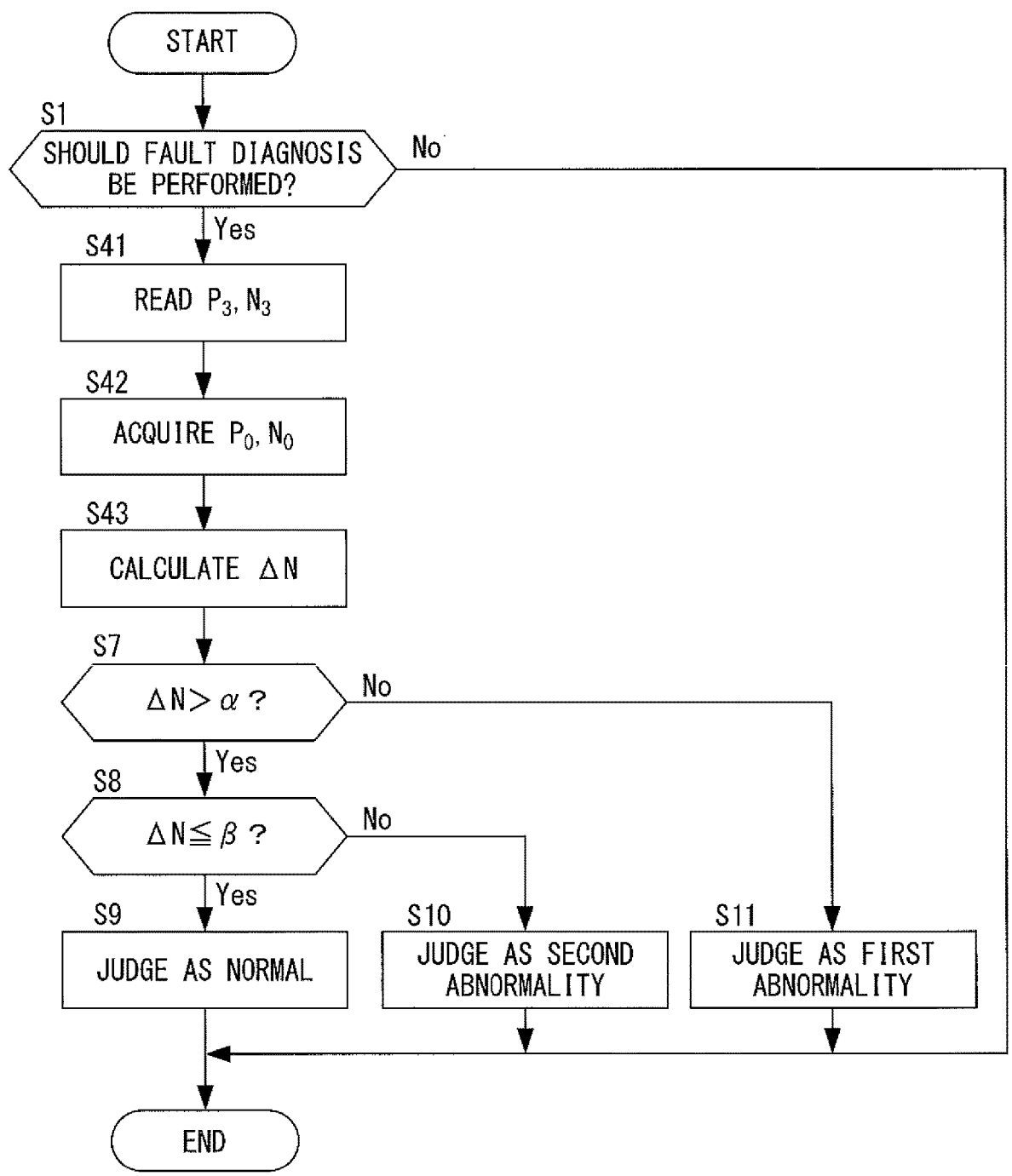
FIG. 9 is a flow chart for explaining fault diagnosis of the aqueous urea solution feed system according to a fourth embodiment of the present disclosure.

FIG. 9 is a flow chart for explaining fault diagnosis of the aqueous urea solution feed system 60 according to the present embodiment. Note that, in FIG. 8, the contents of the processing of step S1 and step S7 to step S11 are similar to the first embodiment, so explanations will be omitted here.

At step S41, the electronic control unit 200 reads in the initial aqueous urea solution pressure $P_3$ and the initial pump rotational speed $N_3$ before aqueous urea solution injection detected and stored by the pressure sensor 67 and rotational speed sensor 68 when the initial aqueous urea solution pressure $P_3$ and the initial pump rotational speed $N_3$ before aqueous urea solution injection were in the initial state where it could be judged that was no abnormality in the aqueous urea solution feed system 60. The initial aqueous urea solution pressure $P_3$ and the initial pump rotational speed $N_3$ before aqueous urea solution injection may be the instant values of the aqueous urea solution pressure and pump rotational speed detected by the pressure sensor 67 and rotational speed sensor 68 when in the initial state or may be average values.

At step S42, the electronic control unit 200 acquires the aqueous urea solution pressure $P_0$ and pump rotational speed $N_0$ before aqueous urea solution injection at the current point of time.

At step S43, the electronic control unit 200 calculates the pump rotational speed difference $\Delta N$ comprised of the difference of the pump rotational speed $N_0$ before aqueous urea solution injection and the initial pump rotational speed $N_3$ before aqueous urea solution injection. The aqueous urea solution feed system 60 (fluid feed system) according to the present embodiment explained above is provided with a gear pump 64, an aqueous urea solution injector 62 (injection device) for injecting aqueous urea solution (fluid) discharged from the gear pump 64, a high pressure side feed pipe 63b (fluid passage) connecting the gear pump 64 and the aqueous urea solution injector 62, a pressure sensor 67 (pressure detector) provided at the high pressure side feed pipe 63b and detecting the aqueous urea solution pressure comprised of the pressure of the aqueous urea solution discharged from the gear pump 64, and a rotational speed sensor 68 (rotational speed detector) detecting the pump rotational speed comprised of the rotational speed of the gear pump 64.

Further, the electronic control unit 200 for fault diagnosis of the aqueous urea solution feed system 60 (fault diagnosis device) is configured comprising a storage part acquiring and storing the aqueous urea solution pressure and pump rotational speed at a certain point of time before aqueous urea solution injection in which the aqueous urea solution injector 62 is not injecting fluid or the average values of the aqueous urea solution pressure and pump rotational speed in a certain time period as the initial aqueous urea solution pressure $P_3$ and the initial pump rotational speed $N_3$ before aqueous urea solution injection, an acquiring part acquiring the aqueous urea solution pressure and pump rotational speed after acquiring the initial aqueous urea solution pressure $P_3$ and the initial pump rotational speed $N_3$ at any point of time before aqueous urea solution injection, or the average values of the aqueous urea solution pressure and pump rotational speed at any time period as the aqueous urea solution pressure $P_0$ and pump rotational speed $N_0$ before aqueous urea solution injection, a pump rotational speed difference calculating part calculating a pump rotational speed difference $\Delta N$ comprised of a difference between the initial pump rotational speed $N_3$ before aqueous urea solution injection and the pump rotational speed $N_0$ before aqueous urea solution injection when the initial fluid pressure $P_3$ before aqueous urea solution injection and the aqueous urea solution pressure $P_0$ before aqueous urea solution injection match, and an abnormality judging part judging based on the pump rotational speed difference $\Delta N$ whether the high pressure side feed pipe 63b or the aqueous urea solution return pipe 65 at the upstream side in the direction of flow of the aqueous urea solution from the check valve 66 has become abnormal due to clogging or leaking of the aqueous urea solution.

In this way, by viewing the change in the pump rotational speed difference $\Delta N$ comprised of the difference between the initial value (initial pump rotational speed $N_3$) and current value (pump rotational speed $N_0$) of the pump rotational speed before aqueous urea solution injection, it is possible to judge if the high pressure side feed pipe 63b or the aqueous urea solution return pipe 65 at the upstream side in the direction of flow of the aqueous urea solution from the check valve 66 has been clogged by the aqueous urea solution or is leaking the aqueous urea solution. Further, the pump rotational speed difference $\Delta N$ becomes a constant value not affected by the tooth top clearances T or side surface clearances S or the viscosity $\mu$ of the aqueous urea solution if the pipes have not become clogged or are not leaking, so it is possible to accurately judge if these abnormalities have occurred.

Above, embodiments of the present disclosure were explained, but the above embodiments only show some of the examples of application of the present disclosure. They are not meant to limit the technical scope of the present disclosure to the specific constitutions of the above embodiments.

For example, in the above-mentioned first embodiment, the aqueous urea solution pressure $P_0$ and pump rotational speed $N_0$ before aqueous urea solution injection were acquired at each fault diagnosis, but it is also possible not to acquire them at each fault diagnosis, but, like in the fourth embodiment, to use the initial aqueous urea solution pressure $P_3$ and the initial pump rotational speed $N_3$ before aqueous urea solution injection which had been acquired once then stored for each fault diagnosis.

Further, in the above-mentioned fourth embodiment, the aqueous urea solution pressure and pump rotational speed during aqueous urea solution injection at a certain point of time detected by the pressure sensor 67 and rotational speed sensor 68, for example, right after factory shipment or otherwise when in the initial state where it can be judged there is no abnormality in the aqueous urea solution feed system 60, may be stored as the initial aqueous urea solution pressure $P_4$ and the initial pump rotational speed $N_4$ during aqueous urea solution injection, the difference of the initial pump rotational speed $N_4$ during aqueous urea solution injection and the pump rotational speed $N_0$ when the aqueous urea solution pressure $P_0$ during aqueous urea solution injection becomes the initial aqueous urea solution pressure $P_4$ during aqueous urea solution injection may be calculated as the pump rotational speed difference $\Delta N$, and fault diagnosis may be performed based on this pump rotational speed difference $\Delta N$.

The invention claimed is:

1. A fault diagnosis device for a fluid feed system, the fluid feed system comprising:
   a gear pump;
   an injection device for injecting fluid discharged from the gear pump;
   a fluid passage connecting the gear pump and the injection device;
   a discharge passage connected to the fluid passage for discharging excess fluid in the fluid discharged from the gear pump;
   a pressure detector provided in the fluid passage and detecting a fluid pressure comprised of pressure of the fluid discharged from the gear pump; and
   a rotational speed detector detecting a pump rotational speed comprised of a rotational speed of the gear pump, wherein
   the fault diagnosis device comprises:
      a first acquiring part configured to acquire (i) a first fluid pressure and a first pump rotational speed at a first point of time before fluid injection where the injection device is not injecting fluid, or (ii) first average values of the first fluid pressure and the first pump rotational speed in a first time period, as a fluid pressure and a pump rotational speed before fluid injection;
      a second acquiring part configured to acquire (i) a second fluid pressure and a second pump rotational speed at a second point of time during fluid injection where the injection device is injecting fluid, or (ii) second average values of the second fluid pressure and the second pump rotational speed in a second time period, as a fluid pressure and a pump rotational speed during fluid injection;
      a pump rotational speed difference calculating part configured to calculate a pump rotational speed difference comprised of a difference between the pump rotational speed during fluid injection and the pump rotational speed before fluid injection when the fluid pressure before fluid injection and the fluid pressure during fluid injection match; and
      an abnormality judging part configured to judge if an abnormality has occurred in the flow rate of the fluid injected from the injection device based on the pump rotational speed difference.

2. The fault diagnosis device for the fluid feed system according to claim 1, wherein
   the abnormality judging part is configured so as to judge that an abnormality of a decrease in flow rate of fluid injected from the injection device from normal has occurred if the pump rotational speed difference is equal to or less than a predetermined first threshold value smaller than a normal value of the time when there is no abnormality in the fluid feed system.

3. The fault diagnosis device for the fluid feed system according to claim 1, wherein
   the abnormality judging part is configured so as to judge that an abnormality of an increase in flow rate of fluid injected from the injection device from normal has occurred if the pump rotational speed difference is equal to or greater than a predetermined second threshold value larger than a normal value of the time when there is no abnormality in the fluid feed system.

4. The fault diagnosis device for the fluid feed system according to claim 1, wherein
   the pump rotational speed difference calculating part comprises an estimated value calculating part configured so as to calculate an estimated value of the pump rotational speed, and
   the estimated value calculating part comprises:
      a fluid pressure difference calculating part configured so as to calculate a fluid pressure difference comprised of a difference between the fluid pressure before fluid injection and the fluid pressure during fluid injection before the fluid pressure before fluid injection and the fluid pressure during fluid injection match; and a differential value calculating part configured so as to calculate a difference between the pump rotational speed during fluid injection and the pump rotational speed before fluid injection before the fluid pressure before fluid injection and the fluid pressure during fluid injection match, and the estimated value calculating part is configured so as to correct the differential value to calculate the pump rotational speed difference based on the fluid pressure difference.

5. The fault diagnosis device for the fluid feed system according to claim 4, wherein the estimated value calculating part is configured to calculate based on the fluid pressure difference a correction value which becomes greater as the fluid pressure difference becomes greater and to add the correction value to the differential value to calculate the estimated value of the pump rotational speed difference.

6. The fault diagnosis device for the fluid feed system according to claim 5, wherein the estimated value calculating part is configured to further increase the correction value as the temperature of the fluid increases.

7. The fault diagnosis device for the fluid feed system according to claim 2, wherein the abnormality judging part comprises a first correcting part configured so as to correct the first threshold value, and the first correcting part is configured to correct the first threshold value based on a fluid pressure difference comprised of a difference between the fluid pressure before fluid injection and the fluid pressure during fluid injection before the fluid pressure before fluid injection and the fluid pressure during fluid injection match.

8. The fault diagnosis device for the fluid feed system according to claim 7, wherein the first correcting part is configured so as to perform correction based on the fluid pressure difference, the correction including calculating a correction value which becomes larger as the fluid pressure difference becomes larger and subtracting the correction value from the first threshold value.

9. The fault diagnosis device for the fluid feed system according to claim 8, wherein the first correcting part is configured so as to further increase the correction value as the temperature of the fluid increases.

10. The fault diagnosis device for the fluid feed system according to claim 3, wherein the abnormality judging part comprises a second correcting part configured so as to correct the second threshold value, and the second correcting part is configured to correct the second threshold value based on a fluid pressure difference comprised of a difference between the fluid pressure before fluid injection and a fluid pressure during fluid injection before the fluid pressure before fluid injection and the fluid pressure during fluid injection match.

11. The fault diagnosis device for the fluid feed system according to claim 10, wherein the second correcting part is configured to perform correction based on the fluid pressure difference, the correction including calculating a correction value which becomes larger as the fluid pressure difference increases and subtracting the correction value from the second threshold value.

12. The fault diagnosis device for the fluid feed system according to claim 11, wherein the second correcting part is configured to further increase the correction value as the temperature of the fluid increases.

13. A fault diagnosis device for a fluid feed system, the fluid feed system comprising:

a gear pump;

an injection device for injecting fluid discharged from the gear pump;

a fluid passage connecting the gear pump and the injection device;

a discharge passage connected to the fluid passage for discharging excess fluid in the fluid discharged from the gear pump;

a pressure detector provided in the fluid passage and detecting a fluid pressure comprised of pressure of the fluid discharged from the gear pump; and a rotational speed detector detecting a pump rotational speed comprised of a rotational speed of the gear pump, wherein the fault diagnosis device comprises:

a storage part configured to acquire and store (i) a first fluid pressure and a first pump rotational speed at a first point of time before fluid injection where the injection device is not injecting fluid, or (ii) first average values of the first fluid pressure and the first pump rotational speed in a first time period, as an initial fluid pressure and an initial pump rotational speed before fluid injection;

an acquiring part configured to acquire (i) a second fluid pressure and a second pump rotational speed at a second point of time before fluid injection after acquiring the initial fluid pressure and the initial pump rotational speed before fluid injection, or (ii) second average values of the second fluid pressure and the second pump rotational speed in a second time period, as a second fluid pressure and a second pump rotational speed before fluid injection;

a pump rotational speed difference calculating part configured to calculate a pump rotational speed difference comprised of a difference between the initial pump rotational speed before fluid injection and the second pump rotational speed before fluid injection when the initial fluid pressure before fluid injection and the second fluid pressure before fluid injection match; and an abnormality judging part configured to judge if an abnormality of clogging or leaking of the fluid at the fluid passage has occurred based on the pump rotational speed difference.

14. A fault diagnosis method for a fluid feed system, the fluid feed system comprising:

a gear pump;

an injection device for injecting fluid discharged from the gear pump;

a fluid passage connecting the gear pump and the injection device;

a discharge passage connected to the fluid passage for discharging excess fluid in the fluid discharged from the gear pump;

a pressure detector provided in the fluid passage and detecting a fluid pressure comprised of pressure of the fluid discharged from the gear pump; and a rotational speed detector detecting a pump rotational speed comprised of a rotational speed of the gear pump, wherein the fault diagnosis method comprises:
- a first acquiring step of acquiring (i) a first fluid pressure and a first pump rotational speed at a first point of time before fluid injection where the injection device is not injecting fluid, or (ii) first average values of the first fluid pressure and the first pump rotational speed in a first time period, as a fluid pressure and a pump rotational speed before fluid injection;
- a second acquiring step of acquiring (i) a second fluid pressure and a second pump rotational speed at a second point of time during fluid injection where the injection device is injecting fluid, or (ii) second average values of the second fluid pressure and the second pump rotational speed in a second time period, as a fluid pressure and a pump rotational speed during fluid injection;
- a pump rotational speed difference calculating step calculating a pump rotational speed difference comprised of a difference between the pump rotational speed during fluid injection and the pump rotational speed before fluid injection when the fluid pressure before fluid injection and the fluid pressure during fluid injection match; and
- an abnormality judging step judging if an abnormality has occurred in the flow rate of the fluid injected from the injection device based on the pump rotational speed difference.

15. A fault diagnosis method for a fluid feed system, the fluid feed system comprising:
- a gear pump;
- an injection device for injecting fluid discharged from the gear pump;
- a fluid passage connecting the gear pump and the injection device;
- a discharge passage connected to the fluid passage for discharging excess fluid in the fluid discharged from the gear pump;
- a pressure detector provided in the fluid passage and detecting a fluid pressure comprised of pressure of the fluid discharged from the gear pump; and
- a rotational speed detector detecting a pump rotational speed comprised of a rotational speed of the gear pump, wherein the fault diagnosis method comprises:
- a storage step of acquiring and storing (i) a first fluid pressure and a first pump rotational speed at a first point of time before fluid injection where the injection device is not injecting fluid, or (ii) first average values of the first fluid pressure and the first pump rotational speed in a first time period, as an initial fluid pressure and an initial pump rotational speed before fluid injection;
- an acquiring step of acquiring (i) a second fluid pressure and a second pump rotational speed at a second point of time before fluid injection after acquiring the initial fluid pressure and the initial pump rotational speed before fluid injection or (ii) second average values of the second fluid pressure and the second pump rotational speed in a second time period as a second fluid pressure and a second pump rotational speed before fluid injection;
- a pump rotational speed difference calculating step calculating a pump rotational speed difference comprised of a difference between the initial pump rotational speed before fluid injection and the second pump rotational speed before fluid injection when the initial fluid pressure before fluid injection and the second fluid pressure before fluid injection match; and
- an abnormality judging step of judging if an abnormality of clogging or leaking of the fluid at the fluid passage has occurred based on the pump rotational speed difference.

\* \* \* \* \*